United States Patent
Ramsdell et al.

(10) Patent No.: US 10,602,231 B2
(45) Date of Patent: Mar. 24, 2020

(54) METHODS AND APPARATUS FOR LOCAL CHANNEL INSERTION IN AN ALL-DIGITAL CONTENT DISTRIBUTION NETWORK

(71) Applicant: Time Warner Cable Enterprises LLC, New York, NY (US)

(72) Inventors: Scott W. Ramsdell, Charlotte, NC (US); Glen Hardin, Charlotte, NC (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 451 days.

(21) Appl. No.: 14/992,947

(22) Filed: Jan. 11, 2016

(65) Prior Publication Data

US 2016/0205424 A1    Jul. 14, 2016

Related U.S. Application Data

(62) Division of application No. 12/537,192, filed on Aug. 6, 2009, now Pat. No. 9,237,381.

(51) Int. Cl.
 *H04N 21/488* (2011.01)
 *H04N 21/234* (2011.01)
 (Continued)

(52) U.S. Cl.
 CPC ...... *H04N 21/4882* (2013.01); *H04H 20/103* (2013.01); *H04N 21/23424* (2013.01); *H04N 21/23614* (2013.01); *H04N 21/4382* (2013.01)

(58) Field of Classification Search
 CPC ......... H04N 21/4882; H04N 21/23424; H04N 21/23614; H04N 21/4382; H04H 20/103
 See application file for complete search history.

(56) References Cited

U.S. PATENT DOCUMENTS

| 5,528,284 A | 6/1996 | Iwami et al. |
| 5,708,961 A | 1/1998 | Hylton et al. |

(Continued)

FOREIGN PATENT DOCUMENTS

| JP | 2005519365 A | 6/2005 |
| JP | 2005519501 A | 6/2005 |

(Continued)

OTHER PUBLICATIONS

U.S. Appl. No. 10/773,664, Specification, Claims, Abstract, and Figures; "Methods and Apparatus for Display Element Management in an Information Network" dated Feb. 6, 2004, pp. 1-54.

(Continued)

*Primary Examiner* — Benjamin R Bruckart
*Assistant Examiner* — Aklil M Tesfaye
(74) *Attorney, Agent, or Firm* — Gazdzinski & Associates, PC

(57) ABSTRACT

Methods and apparatus for inserting local content of interest in an all digital content delivery network. In one embodiment, the content delivery network comprises a cable television or satellite network, and an RF channel thereof is separated or isolated from an incoming multiplex of all-digital content transmission. The separated RF channel is demodulated to provide a multiplexed transport stream, and packets corresponding to one or more programs from the transport stream are replaced with packets obtained from local compression and encoding of analog programming such as e.g., personal, educational and government (PEG) programming. The inserted programming may also contain closed captioning and emergency data alerts. The resulting encoded transport stream is then re-inserted into the multiplex, modulated, and put back onto the RF channel. In an alternate embodiment, space is reserved within the down- (Continued)

stream multiplex so as to avoid having to remove an existing program stream.

20 Claims, 12 Drawing Sheets

(51) Int. Cl.
*H04H 20/10* (2008.01)
*H04N 21/236* (2011.01)
*H04N 21/438* (2011.01)

(56) References Cited

U.S. PATENT DOCUMENTS

| | | |
|---|---|---|
| 5,719,938 A | 2/1998 | Haas et al. |
| 5,758,257 A | 5/1998 | Herz et al. |
| 5,796,423 A | 8/1998 | Robbins et al. |
| 5,818,438 A | 10/1998 | Howe et al. |
| 5,862,140 A | 1/1999 | Shen et al. |
| 5,897,635 A | 4/1999 | Torres et al. |
| 5,988,078 A | 11/1999 | Levine |
| 6,029,045 A | 2/2000 | Picco et al. |
| 6,052,145 A | 4/2000 | MacRae et al. |
| 6,088,722 A | 7/2000 | Herz et al. |
| 6,133,910 A | 10/2000 | Stinebruner |
| 6,167,432 A | 12/2000 | Jiang |
| 6,181,697 B1 | 1/2001 | Nurenberg et al. |
| 6,198,744 B1 | 3/2001 | Huggins et al. |
| 6,219,710 B1 | 4/2001 | Gray et al. |
| 6,252,634 B1 | 6/2001 | Yuen et al. |
| 6,259,701 B1 | 7/2001 | Shur et al. |
| 6,389,538 B1 | 5/2002 | Gruse et al. |
| 6,446,261 B1 | 9/2002 | Rosser |
| 6,460,182 B1 | 10/2002 | Buabbud |
| 6,463,585 B1 | 10/2002 | Hendricks et al. |
| 6,486,907 B1 | 11/2002 | Farber et al. |
| 6,487,721 B1 | 11/2002 | Safadi |
| 6,519,062 B1 | 2/2003 | Yoo |
| 6,523,696 B1 | 2/2003 | Saito et al. |
| 6,539,548 B1 | 3/2003 | Hendricks et al. |
| 6,608,837 B1 | 8/2003 | Brodigan |
| 6,640,145 B2 | 10/2003 | Hoffberg et al. |
| 6,694,145 B2 | 2/2004 | Riikonen et al. |
| 6,697,376 B1 | 2/2004 | Son et al. |
| 6,698,020 B1 | 2/2004 | Zigmond et al. |
| 6,728,269 B1 | 4/2004 | Godwin et al. |
| 6,760,537 B2 | 7/2004 | Mankovitz |
| 6,785,904 B1 | 8/2004 | Franken et al. |
| RE38,600 E | 9/2004 | Mankovitz et al. |
| 6,788,676 B2 | 9/2004 | Partanen et al. |
| 6,788,775 B1 | 9/2004 | Simpson |
| 6,799,326 B2 | 9/2004 | Boylan et al. |
| 6,807,676 B1 | 10/2004 | Robbins et al. |
| 6,873,622 B1 | 3/2005 | Dodson et al. |
| 6,925,257 B2 | 8/2005 | Yoo |
| 6,944,150 B1 | 9/2005 | McConnell et al. |
| 7,003,670 B2 | 2/2006 | Heaven et al. |
| 7,006,881 B1 | 2/2006 | Hoffberg et al. |
| 7,009,972 B2 | 3/2006 | Maher et al. |
| 7,027,460 B2 | 4/2006 | Iyer et al. |
| 7,039,048 B1 | 5/2006 | Monta et al. |
| 7,039,932 B2 | 5/2006 | Eldering |
| 7,054,902 B2 | 5/2006 | Toporek et al. |
| 7,068,639 B1 | 6/2006 | Varma et al. |
| 7,085,287 B2 | 8/2006 | Chapman |
| 7,099,308 B2 | 8/2006 | Merrill et al. |
| 7,099,348 B1 | 8/2006 | Warwick |
| 7,106,382 B2 | 9/2006 | Shiotsu |
| 7,149,772 B1 | 12/2006 | Kalavade |
| 7,174,126 B2 | 2/2007 | McElhatten et al. |
| 7,174,127 B2 | 2/2007 | Otten et al. |
| 7,174,385 B2 | 2/2007 | Li |
| 7,185,353 B2 | 2/2007 | Schlack |
| 7,188,085 B2 | 3/2007 | Pelletier |
| 7,209,458 B2 | 4/2007 | Ahvonen et al. |
| 7,213,036 B2 | 5/2007 | Apparao et al. |
| 7,242,960 B2 | 7/2007 | van Rooyen et al. |
| 7,242,988 B1 | 7/2007 | Hoffberg et al. |
| 7,254,608 B2 | 8/2007 | Yeager et al. |
| 7,325,073 B2 | 1/2008 | Shao et al. |
| 7,330,483 B1 | 2/2008 | Peters, Jr. et al. |
| 7,359,375 B2 | 4/2008 | Lipsanen et al. |
| 7,363,643 B2 | 4/2008 | Drake et al. |
| 7,376,386 B2 | 5/2008 | Phillips et al. |
| 7,383,243 B2 | 6/2008 | Conkwright et al. |
| 7,444,655 B2 | 10/2008 | Sardera |
| 7,457,520 B2 | 11/2008 | Rossetti et al. |
| 7,486,869 B2 | 2/2009 | Alexander et al. |
| 7,567,983 B2 | 7/2009 | Pickelsimer et al. |
| 7,592,912 B2 | 9/2009 | Hasek et al. |
| 7,602,820 B2 | 10/2009 | Helms et al. |
| 7,650,319 B2 | 1/2010 | Hoffberg et al. |
| 7,690,020 B2 | 3/2010 | Lebar |
| 7,693,171 B2 | 4/2010 | Gould |
| 7,716,668 B2 | 5/2010 | Moore et al. |
| 7,721,314 B2 | 5/2010 | Sincaglia et al. |
| 7,742,074 B2 | 6/2010 | Minatogawa |
| 7,768,546 B1 | 8/2010 | Boehringer, Jr. |
| 7,770,200 B2 | 8/2010 | Brooks et al. |
| 7,809,942 B2 | 10/2010 | Baran et al. |
| 7,873,660 B1 | 1/2011 | Wong et al. |
| 7,889,765 B2 | 2/2011 | Brooks et al. |
| 7,900,052 B2 | 3/2011 | Jonas et al. |
| 7,954,131 B2 | 5/2011 | Cholas et al. |
| 8,078,669 B2 | 12/2011 | Ladd et al. |
| 8,099,757 B2 | 1/2012 | Riedl et al. |
| 8,244,909 B1 | 8/2012 | Hanson et al. |
| 8,345,677 B2 * | 1/2013 | Crookes ............ H04N 21/2362 370/389 |
| 8,347,341 B2 | 1/2013 | Markley et al. |
| 8,484,511 B2 | 7/2013 | Engel et al. |
| 8,855,469 B2 | 10/2014 | Maharajh et al. |
| 9,213,538 B1 | 12/2015 | Ladd et al. |
| 9,215,423 B2 | 12/2015 | Kimble et al. |
| 2001/0004768 A1 | 6/2001 | Hodge et al. |
| 2001/0033583 A1 | 10/2001 | Rabenko et al. |
| 2002/0007491 A1 | 1/2002 | Schiller et al. |
| 2002/0024943 A1 | 2/2002 | Karaul et al. |
| 2002/0027883 A1 | 3/2002 | Belaiche |
| 2002/0032754 A1 | 3/2002 | Logston et al. |
| 2002/0056125 A1 | 5/2002 | Hodge et al. |
| 2002/0059619 A1 | 5/2002 | Lebar |
| 2002/0066033 A1 | 5/2002 | Dobbins et al. |
| 2002/0078444 A1 | 6/2002 | Krewin et al. |
| 2002/0087976 A1 * | 7/2002 | Kaplan ............ H04N 7/17336 725/34 |
| 2002/0123928 A1 | 9/2002 | Eldering et al. |
| 2002/0133513 A1 | 9/2002 | Townsend et al. |
| 2002/0144260 A1 | 10/2002 | Devara |
| 2002/0147771 A1 | 10/2002 | Traversat et al. |
| 2002/0152299 A1 | 10/2002 | Traversat et al. |
| 2002/0166120 A1 | 11/2002 | Boylan et al. |
| 2002/0178446 A1 | 11/2002 | Sie et al. |
| 2002/0188744 A1 | 12/2002 | Mani |
| 2002/0188869 A1 | 12/2002 | Patrick |
| 2003/0002577 A1 | 1/2003 | Pinder |
| 2003/0016627 A1 | 1/2003 | Melampy et al. |
| 2003/0016701 A1 | 1/2003 | Hinson |
| 2003/0023983 A1 | 1/2003 | Pidgeon et al. |
| 2003/0028888 A1 | 2/2003 | Hunter et al. |
| 2003/0056217 A1 | 3/2003 | Brooks |
| 2003/0115267 A1 | 6/2003 | Hinton et al. |
| 2003/0121055 A1 * | 6/2003 | Kaminski ............ H04N 5/76 725/115 |
| 2003/0126611 A1 | 7/2003 | Chernock et al. |
| 2003/0126618 A1 | 7/2003 | Wright |
| 2003/0149975 A1 | 8/2003 | Eldering et al. |
| 2003/0165241 A1 | 9/2003 | Fransdonk |
| 2003/0166401 A1 | 9/2003 | Combes et al. |
| 2003/0208767 A1 | 11/2003 | Williamson et al. |
| 2003/0213001 A1 | 11/2003 | Yuen et al. |
| 2003/0217137 A1 | 11/2003 | Roese et al. |
| 2003/0217365 A1 | 11/2003 | Caputo |
| 2003/0220100 A1 | 11/2003 | McElhatten et al. |

(56) References Cited

U.S. PATENT DOCUMENTS

| | | |
|---|---|---|
| 2003/0221191 A1 | 11/2003 | Khusheim |
| 2003/0225777 A1 | 12/2003 | Marsh |
| 2004/0015398 A1 | 1/2004 | Hayward |
| 2004/0024880 A1 | 2/2004 | Elving et al. |
| 2004/0034877 A1 | 2/2004 | Nogues |
| 2004/0040035 A1 | 2/2004 | Carlucci et al. |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0133923 A1 | 7/2004 | Watson et al. |
| 2004/0137918 A1 | 7/2004 | Varonen et al. |
| 2004/0148625 A1 | 7/2004 | Eldering et al. |
| 2004/0158858 A1 | 8/2004 | Paxton et al. |
| 2004/0181800 A1 | 9/2004 | Rakib et al. |
| 2004/0190515 A1* | 9/2004 | Nogima .......... H04N 21/2181 370/392 |
| 2004/0226043 A1 | 11/2004 | Mettu et al. |
| 2004/0230994 A1 | 11/2004 | Urdang et al. |
| 2004/0250273 A1 | 12/2004 | Swix et al. |
| 2005/0022247 A1 | 1/2005 | Bitran et al. |
| 2005/0034171 A1 | 2/2005 | Benya |
| 2005/0049886 A1 | 3/2005 | Grannan et al. |
| 2005/0055220 A1 | 3/2005 | Lee et al. |
| 2005/0055685 A1 | 3/2005 | Maynard et al. |
| 2005/0060742 A1 | 3/2005 | Riedl et al. |
| 2005/0086334 A1 | 4/2005 | Aaltonen et al. |
| 2005/0086683 A1 | 4/2005 | Meyerson |
| 2005/0108763 A1 | 5/2005 | Baran et al. |
| 2005/0114900 A1 | 5/2005 | Ladd et al. |
| 2005/0125824 A1 | 6/2005 | Bienstock |
| 2005/0177855 A1 | 8/2005 | Maynard et al. |
| 2005/0187823 A1 | 8/2005 | Howes |
| 2005/0190794 A1* | 9/2005 | Krause .......... H04L 29/06027 370/485 |
| 2005/0198686 A1 | 9/2005 | Krause et al. |
| 2005/0216933 A1 | 9/2005 | Black |
| 2005/0228725 A1 | 10/2005 | Rao et al. |
| 2005/0235307 A1 | 10/2005 | Relan et al. |
| 2005/0289618 A1 | 12/2005 | Hardin |
| 2006/0017846 A1 | 1/2006 | Kim et al. |
| 2006/0020786 A1 | 1/2006 | Helms et al. |
| 2006/0021004 A1 | 1/2006 | Moran et al. |
| 2006/0041905 A1 | 2/2006 | Wasilewski |
| 2006/0047957 A1 | 3/2006 | Helms et al. |
| 2006/0088062 A1* | 4/2006 | Arsenault .......... H04B 7/18523 370/477 |
| 2006/0095940 A1 | 5/2006 | Yearwood |
| 2006/0117354 A1 | 6/2006 | Schutte et al. |
| 2006/0130099 A1 | 6/2006 | Rooyen |
| 2006/0130101 A1 | 6/2006 | Wessel Van Rooyen et al. |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0149624 A1 | 7/2006 | Baluja et al. |
| 2006/0149850 A1 | 7/2006 | Bowman |
| 2006/0156332 A1 | 7/2006 | Kendall |
| 2006/0161635 A1 | 7/2006 | Lamkin et al. |
| 2006/0168609 A1 | 7/2006 | Chen |
| 2006/0171390 A1 | 8/2006 | La Joie |
| 2006/0171423 A1 | 8/2006 | Helms et al. |
| 2006/0187900 A1 | 8/2006 | Akbar |
| 2006/0206712 A1 | 9/2006 | Dillaway et al. |
| 2006/0209799 A1 | 9/2006 | Gallagher et al. |
| 2006/0218604 A1 | 9/2006 | Riedl et al. |
| 2006/0225118 A1 | 10/2006 | Rolls et al. |
| 2006/0233372 A1 | 10/2006 | Shaheen et al. |
| 2006/0248553 A1 | 11/2006 | Mikkelson et al. |
| 2006/0248556 A1 | 11/2006 | Yuen et al. |
| 2006/0251097 A1 | 11/2006 | Chapman et al. |
| 2006/0259927 A1 | 11/2006 | Acharya et al. |
| 2006/0287915 A1* | 12/2006 | Boulet .......... G06Q 30/02 705/14.61 |
| 2006/0291506 A1 | 12/2006 | Cain |
| 2007/0019645 A1 | 1/2007 | Menon |
| 2007/0022459 A1 | 1/2007 | Gaebel, Jr. et al. |
| 2007/0022469 A1 | 1/2007 | Cooper et al. |
| 2007/0033531 A1 | 2/2007 | Marsh |
| 2007/0040934 A1* | 2/2007 | Ramaswamy .......... H04N 21/235 348/385.1 |
| 2007/0049245 A1 | 3/2007 | Lipman |
| 2007/0055984 A1* | 3/2007 | Schiller .......... H04N 21/2221 725/32 |
| 2007/0061023 A1 | 3/2007 | Hoffberg et al. |
| 2007/0067851 A1 | 3/2007 | Fernando et al. |
| 2007/0076728 A1 | 4/2007 | Rieger et al. |
| 2007/0094691 A1 | 4/2007 | Gazdzinski |
| 2007/0121678 A1 | 5/2007 | Brooks et al. |
| 2007/0124488 A1 | 5/2007 | Baum et al. |
| 2007/0136777 A1 | 6/2007 | Hasek et al. |
| 2007/0157262 A1 | 7/2007 | Ramaswamy et al. |
| 2007/0180230 A1 | 8/2007 | Cortez |
| 2007/0186228 A1 | 8/2007 | Ramaswamy et al. |
| 2007/0198839 A1 | 8/2007 | Carle et al. |
| 2007/0204314 A1 | 8/2007 | Hasek et al. |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0245376 A1 | 10/2007 | Svendsen |
| 2007/0250880 A1 | 10/2007 | Hainline |
| 2007/0261116 A1 | 11/2007 | Prafullchandra et al. |
| 2007/0276926 A1 | 11/2007 | LaJoie |
| 2007/0280298 A1 | 12/2007 | Hearn et al. |
| 2007/0288715 A1 | 12/2007 | Boswell et al. |
| 2008/0022012 A1 | 1/2008 | Wang |
| 2008/0059804 A1 | 3/2008 | Shah et al. |
| 2008/0066112 A1 | 3/2008 | Bailey et al. |
| 2008/0091805 A1 | 4/2008 | Malaby et al. |
| 2008/0091807 A1 | 4/2008 | Strub et al. |
| 2008/0098212 A1 | 4/2008 | Helms et al. |
| 2008/0112405 A1 | 5/2008 | Cholas et al. |
| 2008/0120667 A1 | 5/2008 | Zaltsman |
| 2008/0133551 A1 | 6/2008 | Wensley et al. |
| 2008/0155059 A1 | 6/2008 | Hardin et al. |
| 2008/0162353 A1 | 7/2008 | Tom et al. |
| 2008/0170551 A1 | 7/2008 | Zaks |
| 2008/0172287 A1 | 7/2008 | Tien et al. |
| 2008/0177998 A1 | 7/2008 | Apsangi et al. |
| 2008/0201386 A1 | 8/2008 | Maharajh et al. |
| 2008/0201731 A1 | 8/2008 | Howcroft |
| 2008/0209489 A1 | 8/2008 | Joyce et al. |
| 2008/0222684 A1 | 9/2008 | Mukraj et al. |
| 2008/0229379 A1* | 9/2008 | Akhter .......... H04N 7/17354 725/139 |
| 2008/0235746 A1 | 9/2008 | Peters et al. |
| 2008/0273591 A1 | 11/2008 | Brooks et al. |
| 2008/0279534 A1 | 11/2008 | Buttars |
| 2008/0282299 A1 | 11/2008 | Koat et al. |
| 2008/0306903 A1 | 12/2008 | Larson et al. |
| 2009/0083813 A1 | 3/2009 | Dolce et al. |
| 2009/0086643 A1 | 4/2009 | Kotrla et al. |
| 2009/0098861 A1 | 4/2009 | Kalliola et al. |
| 2009/0100459 A1 | 4/2009 | Riedl et al. |
| 2009/0100493 A1 | 4/2009 | Jones et al. |
| 2009/0133048 A1 | 5/2009 | Gibbs et al. |
| 2009/0150917 A1 | 6/2009 | Huffman et al. |
| 2009/0150926 A1 | 6/2009 | Schlack |
| 2009/0172776 A1 | 7/2009 | Makagon et al. |
| 2009/0185576 A1 | 7/2009 | Kisel et al. |
| 2009/0201917 A1 | 8/2009 | Maes et al. |
| 2009/0210912 A1* | 8/2009 | Cholas .......... H04N 5/4401 725/82 |
| 2009/0217318 A1* | 8/2009 | VerSteeg .......... G06Q 30/02 725/32 |
| 2009/0217326 A1 | 8/2009 | Hasek |
| 2009/0225760 A1 | 9/2009 | Foti |
| 2009/0228569 A1 | 9/2009 | Kalmanje et al. |
| 2009/0249421 A1* | 10/2009 | Liu .......... H04L 12/2801 725/116 |
| 2009/0282241 A1 | 11/2009 | Prafullchandra et al. |
| 2009/0292816 A1* | 11/2009 | Etchegoyen .......... H04L 63/08 709/229 |
| 2009/0293101 A1 | 11/2009 | Carter et al. |
| 2010/0005527 A1 | 1/2010 | Jeon |
| 2010/0027560 A1 | 2/2010 | Yang et al. |

(56) References Cited

U.S. PATENT DOCUMENTS

| | | |
|---|---|---|
| 2010/0030578 A1 | 2/2010 | Siddique et al. |
| 2010/0042478 A1 | 2/2010 | Reisman |
| 2010/0083329 A1 | 4/2010 | Joyce et al. |
| 2010/0106846 A1 | 4/2010 | Noldus et al. |
| 2010/0115091 A1 | 5/2010 | Park et al. |
| 2010/0115113 A1 | 5/2010 | Short et al. |
| 2010/0122276 A1 | 5/2010 | Chen |
| 2010/0125658 A1 | 5/2010 | Strasters |
| 2010/0131973 A1 | 5/2010 | Dillon et al. |
| 2010/0138900 A1 | 6/2010 | Peterka et al. |
| 2010/0169977 A1 | 7/2010 | Dasher et al. |
| 2010/0199299 A1 | 8/2010 | Chang et al. |
| 2010/0211967 A1 | 8/2010 | Ramaswamy et al. |
| 2010/0211982 A1 | 8/2010 | Lee et al. |
| 2010/0218231 A1 | 8/2010 | Frink et al. |
| 2010/0280641 A1 | 11/2010 | Harkness et al. |
| 2010/0287209 A1 | 11/2010 | Hauser |
| 2010/0287609 A1 | 11/2010 | Gonzalez et al. |
| 2010/0313225 A1 | 12/2010 | Cholas et al. |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0071841 A1 | 3/2011 | Fomenko et al. |
| 2011/0090898 A1 | 4/2011 | Patel et al. |
| 2011/0093900 A1 | 4/2011 | Patel et al. |
| 2011/0099017 A1 | 4/2011 | Ure |
| 2011/0103374 A1 | 5/2011 | Lajoie et al. |
| 2011/0110515 A1 | 5/2011 | Tidwell et al. |
| 2011/0126018 A1 | 5/2011 | Narsinh et al. |
| 2011/0135013 A1* | 6/2011 | Wegener ............... H03M 7/40 375/241 |
| 2011/0138064 A1 | 6/2011 | Rieger et al. |
| 2011/0178943 A1 | 7/2011 | Motahari et al. |
| 2011/0213688 A1 | 9/2011 | Santos et al. |
| 2011/0219229 A1 | 9/2011 | Cholas et al. |
| 2011/0265116 A1 | 10/2011 | Stern et al. |
| 2011/0267952 A1 | 11/2011 | Ko et al. |
| 2011/0283311 A1 | 11/2011 | Luong |
| 2012/0005527 A1 | 1/2012 | Engel et al. |
| 2012/0008786 A1 | 1/2012 | Cronk et al. |
| 2012/0011567 A1 | 1/2012 | Cronk et al. |
| 2012/0030363 A1 | 2/2012 | Conrad |
| 2012/0079518 A1 | 3/2012 | Wan et al. |
| 2012/0124606 A1 | 5/2012 | Tidwell et al. |

FOREIGN PATENT DOCUMENTS

| | | |
|---|---|---|
| JP | 2005339093 A | 12/2005 |
| JP | 2008015936 A | 1/2008 |
| JP | 2009211632 A | 9/2009 |
| JP | 2010502109 A | 1/2010 |
| JP | 2010079902 A | 4/2010 |
| JP | 2012505436 A | 3/2012 |
| JP | 2012523614 A | 10/2012 |
| WO | WO-2005015422 A1 | 2/2005 |
| WO | WO-2012021245 A1 | 2/2012 |

OTHER PUBLICATIONS

Cantor, et al., Bindings for the OASIS Security Assertion Markup Language (SAML) V2.0, OASIS Standard, Mar. 2005 (http://docs.oasis-open.org/security/saml/v2.0/).

Denning, et al., Cryptography and Data Security, Addison-Wesley Publishing Company, ISBN 0-201-10150-5, 1982.

DLNA (Digital Living Network Alliance) protocols described in DLNA Networked Device Interoperability Guidelines Expanded, Mar. 2006 and subsequent expanded version dated Oct. 2006.

UTF-32, IBM, retrieved from http://publib.boulder.ibm.com/infocenter/iseries/v5r3/index.jsp?topic=%2Fnls%2Frbagsutf32.htm on Aug. 28, 2013.

* cited by examiner

METHODS AND APPARATUS FOR LOCAL CHANNEL INSERTION IN AN ALL-DIGITAL CONTENT DISTRIBUTION NETWORK

PRIORITY AND RELATED APPLICATIONS

This application is a divisional of and claims priority to co-owned U.S. patent application Ser. No. 12/537,192 of the same title filed Aug. 6, 2009, and issuing as U.S. Pat. No. 9,237,381 on Jan. 12, 2016, which is incorporated herein by reference in its entirety. In addition, this application is related to co-owned U.S. patent application Ser. No. 11/186,452 filed Jul. 20, 2005 and entitled "METHOD AND APPARATUS FOR BOUNDARY-BASED NETWORK OPERATION", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content distribution. More particularly, the present invention is related in one exemplary aspect to the insertion of public, education and government (PEG) or other local programming in a digital content distribution network.

2. Description of Related Technology

Historically, delivery of content such as multimedia programs has been accomplished using analog transmission techniques such as over-the-air broadcast using the National Television Standards Committee (NTSC) transmission standard or analog cable transmission techniques, such as described in *"Modern Cable Television Technology"*, Walt Ciciora et al., Second Edition, Morgan Kaufman, 2004, incorporated herein by reference in its entirety. Over the last fifteen years, the traditional analog transmission techniques have been complemented or replaced by digital content distribution techniques such as the American Television Standards Committee (ATSC) digital television broadcasting standards, and the Opencable™ specifications of Cable-Labs, as well as a suite of specifications promulgated by the Society for Cable Television Engineers (SCTE). These well-known standards provide mechanisms for carriage of encoded video and audio content over a distribution network to customer premise equipment (CPE) such as a set top box (STB).

To further exploit the spectral efficiency and flexibility offered by digital content distribution techniques, so-called "all-digital" content distribution techniques have been proposed in recent years. These generally comprise an end-to-end digital transport and processing, ostensibly to increase transmission quality, network robustness, and network efficiency (e.g., spectral or bandwidth efficiency). In the context of cable television, however, such all-digital networks will also require digital set top boxes (DSTBs) or comparable digital-enabled devices in all subscriber installations (as opposed to some existing subscribers using ATSC tuners in e.g., their television set to receive and display analog signals from their coaxial cable directly). The general architecture of a hybrid fiber coaxial (HFC) content distribution network that delivers all-digital content to a consumer's home may take various forms and names, such as switched digital video (SDV), switched digital broadcast (SDB), all-digital, etc.

Digital distribution allows an economically efficient alternative to the traditional analog content distribution techniques. Digital content distribution also provides techniques for carriage of non-video, non-audio services such as closed captioning information, program guides, and other program-related information.

However, to date, not all services have made the transition to the digital delivery paradigm. Moreover, most existing deployments of "digital" content distribution over digital cable actually use a mix of analog and digital distribution techniques.

For example, the insertion of public, education and government (PEG) programming and other such "local" or edge-derived programming in a analog cable delivery network is typically performed by inserting the analog programming at a headend or other location of an extant network multiplexer, and then transmitting the inserted content as part of the channel line-up (multiplexed transport stream) to users downstream from the hub or headend. Obviously, such a method suffers from the disadvantage that, inter alia, it cannot be implemented in a content delivery network in which an all-digital program multiplex is transmitted to customer premises.

Moreover, even if the (analog) local content could be delivered to the customer's DSTB (such as via a channel or transport outside the aforementioned program multiplex), an analog (e.g., NTSC) tuner would be required in order to receive and process the signals for display on the customer's display device. The additional of such analog tuners to all-digital set top boxes (or otherwise in their television, etc.) adds significant cost to these devices.

Alternatively, if the analog content were digitized before it were multiplexed at the headend or other existing multiplexer location, the analog signals (or digitized analog signals) would still need to be backhauled to the that location (e.g., headend), thereby requiring significant additional infrastructure and potentially inducing significant latency.

Various other methods for the distribution of local analog (e.g. PEG) content are known in the prior art. See for example, U.S. Pat. No. 6,198,744 to Huggins, et al. issued Mar. 6, 2001 entitled "ASYNCHRONOUS TRANSFER MODE (ATM) BASED VERY-HIGH-BIT-RATE DIGITAL (VDSL) SUBSCRIBER LINE COMMUNICATION SYSTEM AND METHOD" and U.S. Pat. No. 6,608,837 to Brodigan issued Aug. 19, 2003 entitled "DATA CAROUSEL FRANCHISE PROVISIONING".

As illustrated by the foregoing examples, prior art techniques do not support insertion and formatting of a locally generated analog signal within a content-based network (e.g., HFC cable or satellite) so as to enable compatibility with soon-to-be pervasive DSTB installations. In order to support an all-digital offering with all-digital set top boxes, a new delivery model is required to digitize, distribute, receive and decode analog signals such as the aforementioned PEG content that originate not at the headend but in the outer reaches (e.g., "edge") of a cable network. These external video sources are becoming increasingly common today in the distribution plant (especially at the edges thereof), and will need to be addressed in the all-digital cable network of the future. Existing solutions such as those described above do not address the cost efficient and flexible local insertion of such video (available locally in analog video format) in a digital format, and delivery thereof via the edge infrastructure of a content-based network.

SUMMARY OF THE INVENTION

The foregoing needs are satisfied by the present invention, which discloses, inter alia, methods and apparatus for selecting appropriate digital technology for programming and data delivery over a content-based network such as an HFC cable network.

In a first aspect of the invention, a system for distributing at least one of public, education or government content is disclosed. In one embodiment, the system comprises: a content distribution network providing a digital multiplex of a plurality of program streams to a node on the content distribution network; a local content insertion device disposed at the node and in signal communication with the content distribution network; and a receiver disposed at a premises of a user of the content distribution network, the receiver in signal communication with the local content insertion device and receiving content from the node. The local content insertion device is configured to replace at least one program stream of the digital multiplex of streams with a local program stream input to the local content insertion device.

In one variant, the content distribution network comprises a hybrid fiber-coax (HFC) cable network, and the receiver comprises a digital subscriber premises device adapted to receive the content via a radio frequency (RF) coaxial cable.

In another variant, the local content insertion device is configured for management over the network using at least a data-over-cable (DOCSIS) communication protocol.

In yet another variant, the local program stream input comprises at least one public, educational or government program stream.

In still a further variant, the local content insertion device comprises: a tuner module configured to receive the digital multiplex over a given radio frequency band, the radio frequency band being one of a plurality of such bands associated with a signal carried over the network; a filter module configured to filter the given radio frequency band to produce a filtered network signal; a module configured to drop packets associated with one of the plurality of program streams associated with the digital multiplex; a video encoder configured to receive the local program stream input in analog form and to encode the local program channel input into a digital format suitable for insertion in the digital multiplex; and a multiplexer configured to multiplex the local program stream input in the digital format to produce a new digital multiplex, the new multiplex comprising the local program stream input in digital form.

In another variant, the local content insertion device further comprises: a modulator module configured to modulate the new digital multiplex according to a modulation scheme to produce an output; and a signal adder module configured to add the output to the filtered network signal.

In yet a further variant, the local program stream input is converted by the insertion device to a digital form, and the local content insertion device is adapted to distribute information relating to the bitrate of the digital form of local program stream input to at least one entity of the distribution network. The at least one network entity comprises e.g., a statistical multiplexer disposed upstream of the insertion device in the delivery path of the distribution network. The statistical multiplexer is configured to use the information to adjust the digital multiplex, such as by reservation of bandwidth within the multiplex.

In a second aspect of the invention, a method of operating a content insertion device for use in a content-based network is disclosed. In one embodiment, the method comprises: filtering out a radio frequency band from an incoming signal to produce a filtered incoming signal; encoding analog content to produce encoded digital content; modulating and upconverting the encoded digital content to the frequency of the radio frequency band; mixing the modulated and upconverted encoded digital content with the filtered incoming signal to produce an outgoing signal; and transmitting the outgoing signal onto at least a portion of the content-based network.

In one variant, the transmitting the outgoing signal onto at least a portion of the content-based network comprises transmitting the outgoing signal to a plurality of digital consumer premises devices adapted to receive, demodulate and decode the encoded digital content.

In another variant, the analog content comprises locally generated public, educational or governmental programming.

In yet another variant, the analog content comprises locally generated video from a security system.

In still a further variant, the modulating comprises 256-state quadrature amplitude modulation (256-QAM), and the upconversion comprises upconversion to a frequency between 50 and 800 MHz.

In another variant, the encoded digital content comprises a variable bitrate (VBR) stream, and the method further comprises statistically multiplexing the encoded digital content with at least one other content stream.

In a third aspect of the invention, a method of delivering an all-digital transport stream comprising local content to a digital receiver is disclosed. In one embodiment, the receiver is used within a content-based network comprising a headend and at least one distribution hub, and the method comprises: providing a first multiplexed transport stream comprising a plurality of digitally encoded single transport streams; receiving analog local content at the at least one distribution hub of the network; encoding the analog local content to form a digitally encoded local content stream; inserting the digitally encoded local content stream into the multiplexed transport to produce a second multiplexed transport stream; and providing the second multiplexed transport stream to the digital receiver via that portion of the content-based network between the at least one hub and the digital receiver, and without having to backhaul or provide the analog local content to the headend of the network.

In one variant, the digitally encoded local content stream comprises a variable bitrate (VBR) stream, and the inserting comprises statistically multiplexing the VBR stream with at least portions of the first multiplexed transport to produce the second transport.

In a second variant, the digitally encoded local content stream comprises a variable bitrate (VBR) stream, and the inserting comprises stuffing the VBR with a plurality of additional data to form a constant bitrate (CBR) stream.

In another variant, the at least one distribution hub comprises a broadcast switched architecture (BSA) switching hub.

In a fourth aspect of the invention, a method of inserting local analog programming at a node in a digital content delivery network is disclosed. In one embodiment, the method comprises: receiving the local analog programming at the node; converting the local analog programming into a digital compressed format; and inserting the local analog programming in the digital compressed format into a program transport for delivery over the network.

In one variant, the network comprises a headend and a plurality of distribution hubs, and the receiving at the node comprises receiving the analog programming at one or more of the hubs.

In another variant, the insertion comprises inserting the analog programming in the digital compressed format into a multiplexed transport stream (MPTS). For example, the inserting of the analog programming in the digital compressed format into a multiplexed transport stream (MPTS) comprises statistically multiplexing at least the analog programming in the digital compressed format.

In yet another variant, the analog programming in the digital compressed format comprises a constant bitrate (CBR) stream, and the inserting into a multiplexed transport stream (MPTS) comprises inserting without statistically multiplexing.

In still a further variant, the method further comprises: receiving a first multiplexed transport stream (MPTS) at the node, the first MPTS comprising a plurality of single program transport streams (SPTS); removing at least one of the SPTS from the first MPTS to form a second MPTS; and wherein the inserting the analog programming into a program transport comprises inserting the analog programming into the second MPTS substantially in place of the removed SPTS.

In yet another variant, the removing of the at least on SPTS is accomplished using a program ID (PID) associated with the at least one SPTS.

In a further variant, the receiving the first MPTS comprises: receiving the first MPTS as a QAM-modulated signal using a radio frequency (RF) tuner; and demodulating the received QAM-modulated signal using a demodulator apparatus.

In another variant, the method further comprises: receiving a first multiplexed transport stream (MPTS) at the node, the first MPTS comprising available space sufficient to accommodate the analog programming in the digital compressed format. The insertion of the analog programming into a program transport comprises inserting the analog programming into the first MPTS substantially in the available space.

In a further variant, the program transport comprises a plurality of frequency bands, and the inserting comprises: obtaining a substantial copy of the program transport; filtering the program transport at a first frequency band to produce a filtered program transport; inserting the analog programming in the digital compressed format into a portion of the copy of the program transport; and combining the portion of the copy of the program transport with the filtered program transport to produce an all-digital program transport containing the local analog programming in the digital compressed format.

In a fifth aspect of the invention, network apparatus for use in a content-based network is disclosed. In one embodiment, the apparatus comprises: a filter adapted to filter the incoming signal to remove at least a portion thereof in order to produce a filtered signal; a receiver adapted to receive an analog signal; an encoder adapted to encode the analog signal to form a digitally encoded signal; and a combiner adapted to combine the digitally encoded signal with the filtered signal.

In one variant, the filter comprises a notch filter, and the at least one portion comprises a frequency band associated with at least one QAM channel of the incoming signal.

In another variant, the analog signal comprises an analog video feed obtained from a source local to the apparatus, the analog feed selected from the group consisting of: (i) public programming; (ii) educational programming; and (iii) government programming.

In a further variant, the apparatus further comprises: a signal splitter or replicator adapted to split or replicate an incoming signal to produce second incoming signal; an RF tuner adapted to tune to at least one QAM channel carried within the second incoming signal; a demodulator adapted to demodulate the at least one QAM-modulated channel to produce a demodulated signal; apparatus adapted to remove at least a portion of the demodulated signal to produce processed demodulated signal; and apparatus adapted to insert the digitally encoded signal into the processed demodulated signal to produce an inserted signal. The combining of the digitally encoded signal with the filtered signal comprises: QAM-modulating the inserted signal to produce a modulated inserted signal; and combining the modulated inserted signal with the filtered signal to produce an output signal bearing the digitally encoded analog signal.

In a sixth aspect of the invention, storage apparatus comprising a computer readable medium is disclosed. In one embodiment, the medium is adapted to store a computer program comprising a plurality of instructions which, when executed on a computer, cause the insertion of a digital program stream into a multiplexed transport comprising a plurality of channels according to the method comprising: receiving at least one channel of the multiplexed transport; demodulating the at least one channel; removing at least one program stream within the at least one channel; and inserting the digital program stream into the at least one channel.

In one variant, the inserting comprises: statistically multiplexing the digital program stream with the at least one channel to produce an output multiplex; and upconverting the output multiplex to a frequency substantially identical to a frequency of the at least one channel.

In another variant, the removing comprises removing the at least one stream based on its program ID (PID). The plurality of channels comprise e.g., a plurality of RF QAMs, and the receiving comprises receiving using an RF tuner adapted to tune to the at least one channel.

In still a further variant, the plurality of channels comprise a plurality of RF QAMs, and the receiving comprises receiving using an RF tuner adapted to tune to a plurality of the channels simultaneously.

In another variant, the inserting the digital program stream comprises: receiving a locally generated analog input signal; and digitally encoding the analog signal to produce the digital program stream.

In a further variant, the storage apparatus comprises a mass storage media disposed within a network apparatus disposed at a distribution hub of an all-digital cable television network, and the analog input signal is received at the hub.

In a seventh aspect of the invention, a network-based video monitoring system is disclosed. In one variant, the system comprises: a video camera capable of generating an analog video signal relating to a first premises; network insertion apparatus disposed at a distribution node of the network, the apparatus adapted to receive the analog signal, digitize it, and insert the digitized analog signal into at least one channel being carried over the network to a second premises; and a digital receiver disposed at the second premises, the receiver adapted to receive, decode and enable viewing of the digitized analog signal.

In one variant, the network comprises a cable television network; the distribution node comprises a hub thereof; the digital receiver comprises at least one of (i) a digital set top box, (ii) a cable modem; or (iii) a converged premises device (CPD); and at least one of the first and second premises comprises a premises of a subscriber of the network.

In another variant, the insertion apparatus inserts the digitized analog signal by at least: removing a first program stream from a multiplexed transport carried on the network; and inserting the digitized analog stream substantially in place thereof.

In an eighth aspect of the invention, a method of operating a content-based network comprising a statistical multiplexer and a distribution node is disclosed. In one embodiment, the method comprises: receiving an analog signal at the distribution node; digitizing the analog signal at the node to produce a digital program stream; providing data to the multiplexer or a control process associated therewith, the data relating to the bitrate of the digital program stream; and using the data to control at least one aspect of the multiplexing of a multiplexed transport stream into which the digital program stream will be inserted.

In one variant, the data is generated at the distribution node during or after the act of digitizing.

In a ninth aspect of the invention, signal insertion apparatus for use at a premises is disclosed. In one embodiment, the apparatus comprises: a first receiver configured to receive a radio frequency digital signal; a second receiver configured to receive an analog video signal; encoding apparatus adapted to digitally encode the analog video signal; and insertion apparatus adapted to insert the digitally encoded analog signal into the radio frequency digital signal.

In one variant, the premises comprises a multiple unit complex (MUC), and the analog video signal is derived at least in part from a video source disposed at the MUC.

In another variant, the analog video source comprises one or more security cameras disposed at the MUC; and the radio frequency digital signal is delivered over a cable television network to the MUC.

In yet another variant, the apparatus further comprises transmission apparatus adapted to transmit the radio frequency digital signal with the digitally encoded analog signal therein back onto at least a portion of the cable network for delivery to at least one digital receiver within or proximate to the MUC.

In a tenth aspect of the invention, a method of doing business over a content-based network is disclosed. In one embodiment, the method comprises: receiving local programming at a hub in the network; receiving management information related to insertion of the local programming; receiving a programming signal at the hub; and transmitting the local programming to subscriber premises by replacing, in response to the management information, a part of the programming signal with a signal produced from the local programming.

In one variant, the programming signal is paid for by a subscriber of the content-based network, and the local programming is provided at no additional cost to the subscriber.

In another variant, the local programming is available at the hub in analog video format, and the transmitting of the local programming to a customer premises is performed in a digital broadcast format.

In an eleventh aspect of the invention, apparatus for distributing at least digitally rendered content is disclosed. In one embodiment, the apparatus comprises: a content distribution network providing a digital multiplex of a plurality of program streams to a node on the content distribution network; and a local content insertion apparatus disposed at the node and in signal communication with the content distribution network, the local content insertion apparatus configured to perform at least one of insertion of, or replacement using, digital content input to the local content insertion apparatus; and transmission apparatus configured to transmit the inserted or replaced digital content to a receiver disposed at a premises of a user of the content distribution network.

In a twelfth aspect of the invention, apparatus disposed at a node in a network is disclosed. In one embodiment, the apparatus comprises: a receiver apparatus configured to receive an incoming digital signal over at least one radio frequency band; a data input apparatus configured to receive packetized Internet protocol (IP) data; a data combination apparatus configured to combine the packetized IP data with at least a portion of the incoming digital signal to generate an outgoing digital signal; and a transmission apparatus configured to transmit the outgoing digital signal to a receiver disposed at a premises of a user of the network.

In a thirteenth aspect of the invention, apparatus for distributing at least digitally rendered content is disclosed. In one embodiment, the apparatus is disposed at a node in a digital content delivery network. The apparatus comprises: a first receiver apparatus configured to receive a first program transport stream; a second receiver apparatus configured to receive an analog content stream; an encoder configured to encode said analog content stream into a digital format suitable for insertion into said first program transport stream; a modulation and upconversion apparatus configured to modulate and upconvert said digitally formatted analog content stream for transmission via a frequency band associated with a signal carried over said digital content delivery network; a combination apparatus configured to combine said modulated and upconverted digitally formatted content stream with said first program transport stream to generate a second program transport stream; and apparatus configured to cause provision of said second program transport stream for subsequent transmission to a receiver disposed at a premises of a user of said digital content delivery network.

These and other aspects of the invention shall become apparent when considered in light of the disclosure provided below.

BRIEF DESCRIPTION OF THE DRAWINGS

The above and other features and advantages of the present invention are hereinafter described in the following detailed description of illustrative embodiments to be read in conjunction with the accompanying drawings and figures, wherein like reference numerals are used to identify the same or similar system parts and/or method steps, and in which.

DETAILED DESCRIPTION OF THE INVENTION

Figure 1:
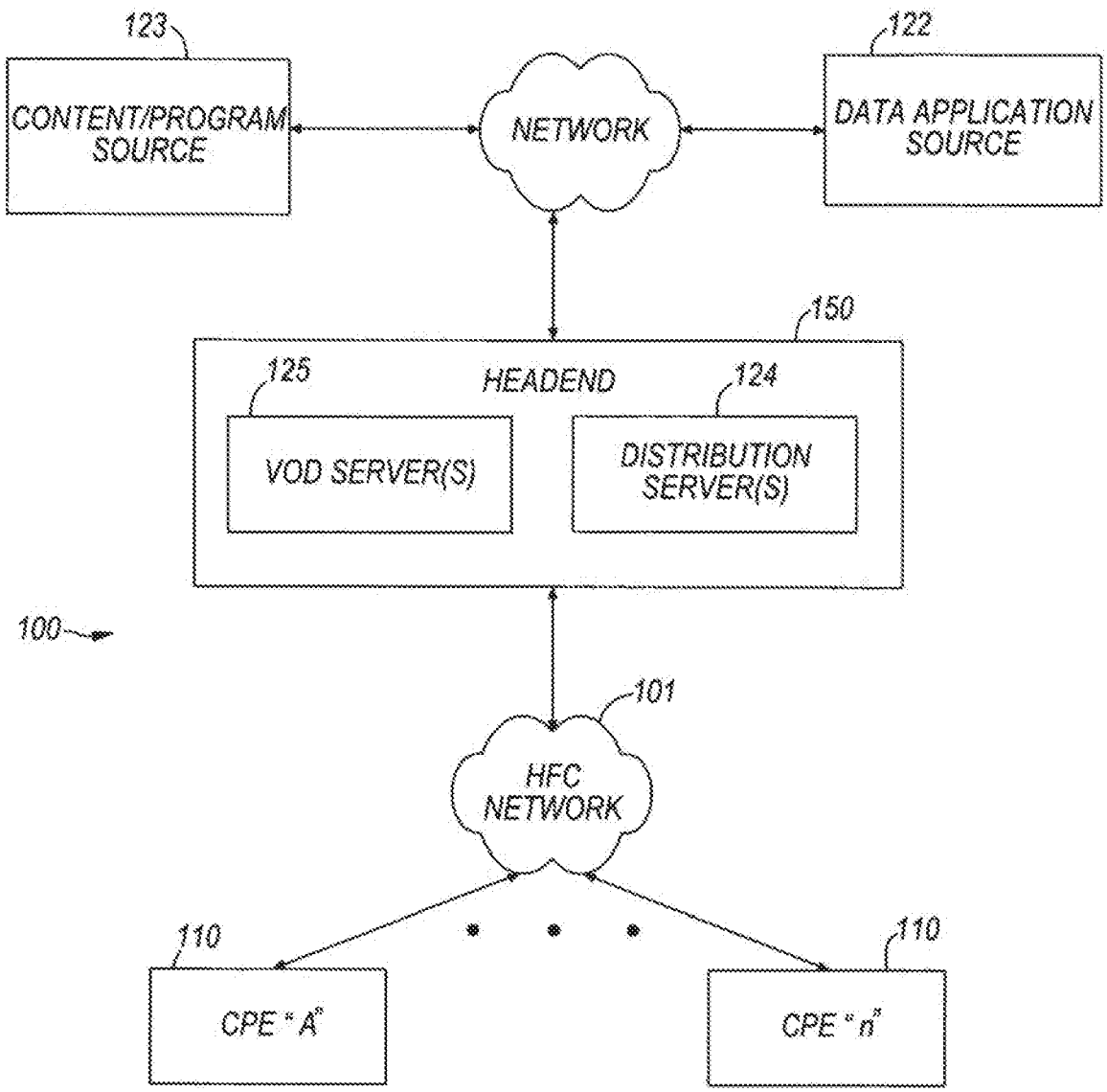
FIG. 1 is a functional block diagram illustrating an exemplary HFC network configuration useful with the present invention.

Reference is now made to the drawings wherein like numerals refer to like parts throughout.

As used herein, the term "all-digital" is intended to encompass, without limitation, various embodiments of digital content distribution systems in which programming sent to a consumer's premises is in digital format.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "conditional access" refers to any access control scheme, whether implemented in hardware, software, or firmware (or combinations thereof), including without limitation members of the "Powerkey" family (Powerkey Book 2, Powerkey Book 3, etc.), NDS (including VideoGuard, mVideoGuard, etc.), ANSI/SCTE Standard 52 2003 (DVS-042), incorporated herein by reference in its entirety, and Motorola/General Instrument DigiCipher® family (DigiCipher II, etc.). These can be implemented using, for example, the so-called "CableCard" plug-in security module access technology, a downloadable CA system (DCAS), or otherwise.

The terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set top boxes, televisions, Digital Video Recorders (DVR), gateway storage devices (Furnace), and ITV Personal Computers.

As used herein, the term "display" means any type of device adapted to display information, including without limitation: CRTs, LCDs, TFTs, plasma displays, LEDs, incandescent and fluorescent devices. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation VLSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "local analog" refers without limitation to analog signals or content that are derived from sources at or near the edge of a content-based network, such as e.g., local community channels, multi-unit complex (MUC) character generators, security or monitoring cameras, and the like.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "modulate", "modulation" and similar forms refer to the modulation of information onto a signal, including without limitation amplitude modulation (e.g., 64- or 256-QAM), phase shift keying (e.g., PSK or QPSK), vestigial sideband modulation (e.g., 16-VSB), frequency modulation (FM), and pulse-code modulation (PCM).

As used herein, the terms "MSO" or "multiple systems operator" refer to a cable, fiber to the home (FTTH), fiber to the curb (FTTC), satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11A,b,g,n), WiMAX (802.16), PAN (802.15), or IrDA families.

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers to either a group of service users (e.g. subscribers) or the resources shared by them in the form of entire cable RF signal, only the RF channels used to receive the service or otherwise treated as a single logical unit by the network for resource assignment.

As used herein, the term "statistical" refers without limitation to any process, component or analytical framework based at least in part on one or more statistical, anecdotal or deterministic parameters. Such process, component or framework may be implemented for example using a posteriori data, via actual or effective a priori relationships or data, or otherwise.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the terms "user channel" and "program channel" are all generally synonymous with the concept of a perceived stream of information. For example, a program/user channel might comprise "Channel 3" which carries the content of a given network (e.g., NBC). This is to be distinguished from a physical channel, which is used to physically carry and distribute the content, which may for example comprise one or more QAMs within a given portion of the RF spectrum of a cable system.

As used herein, the term "video" is meant to generally include, without limitation, audio and/or video and other associated multimedia information that comprise content, such as for example an on-demand program. Exemplary types of services and models for providing such video include, without limitation, broadcast video, Video-On-Demand (VOD), IPTV, "Video To Go", and network personal video recorder (nPVR).

As used herein, the term "WiFi" refers to, without limitation, any of the variants of IEEE-Std. 802.11 or related standards including 802.11 a/b/g/n.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention provides methods and apparatus for the efficient and flexible insertion of public, education and government (PEG) programming or other locally generated analog signals (e.g., video feeds) into an all-digital content distribution network.

In one embodiment, an analog signal conditioning and insertion apparatus is disclosed which functions to (i) selectively locate or create "space" for the signals to be inserted within a downstream signal (e.g., multiplexed transport stream, or MPTS, of a cable or satellite network); (ii) condition (e.g., digitally encode) the analog signals; and (iii) insert the signals back into the relevant transport of the downstream signal. In one variant, the insertion apparatus operates to filter a given QAM from a downstream signal, and replace that filtered QAM with a new QAM that includes the digitally encoded analog (local) program stream. The insertion of the program stream may be accomplished by either: (i) removing an existing PID within the multiplex transport stream (MPTS) associated with the filtered QAM, and replacing it with the digitally encoded analog stream; or (ii) having the statistical multiplexer or other upstream entity responsible for generating the filtered QAM leave "room" within the MPTS for insertion of the new digital program stream. The new stream may either comprise a constant bitrate or CBR stream (such as by applying bit stuffing or other such mechanisms), or a variable bitrate (VBR) stream.

The insertion apparatus is located for example at a local distribution hub of the network (i.e., at or near the network edge), thereby obviating (i) having to backhaul or otherwise provide the analog signals to the headend or other portion of the network core, and (ii) using additional downstream bandwidth to carry the converted analog signals via a downstream multiplex generated at or near the core. It also reduces the latency associated with delivery of the signals to some degree.

In another variant, the insertion apparatus comprises a personal computer (PC) or other such form factor disposed at a multi-subscriber premises, such as a multiple unit complex (MUC) or apartment complex. The locally generated input (e.g., from an MUC character generator or security video camera) is inserted into the digital cable or satellite signal using the local insertion apparatus, and then distributed to one or more subscribers within the MUC.

Moreover, this approach advantageously allows for a very limited number of signal conditioning and insertion devices to be used within the distribution network, as opposed to outfitting all of the receivers (e.g., DSTBs or television monitors) within the network with analog tuners, thereby providing very significant cost savings to the network operator (and prospectively the network subscribers, whose subscription price may be lowered accordingly, and who do not have to provide a television with a NTSC tuner to receive the aforementioned analog feeds).

Such distribution plant-based conditioning and insertion also allows for enhanced flexibility in terms of which analog sources are inserted (e.g., PEG, locally generated video feeds, etc.); i.e., dynamic switching of the analog feeds can be performed (along with optional dynamic changes to the program map) to rapidly and easily change program channel lineups for certain groups of subscribers.

Improved network-based video monitoring systems, and methods of doing business using the aforementioned apparatus and techniques, are also disclosed herein.

Detailed Description of Exemplary Embodiments

Exemplary embodiments of the apparatus and methods of the present invention are now described in detail.

While these exemplary embodiments are described in the context of the aforementioned hybrid fiber coax (HFC) cable system architecture having an multi-systems operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature. For example, these techniques can readily be employed in the context of a broadband satellite network.

It will also be appreciated that while described generally in the context of a network providing service to a customer (i.e., home) end user domain or multiple unit complex (MUC) such as an apartment complex, office building, or hotel, the present invention may be readily adapted to other types of environments including, e.g., commercial/enterprise, and government/military applications.

System Architecture—

FIG. 1 illustrates a high-level diagram of a typical content-based network configuration with which the local or "edge" content insertion apparatus and methodologies of the present invention may be used. The various components of the network 100 include (i) one or more data and application origination points 122; (ii) one or more content or program sources 123; (iii) one or more application/data/content distribution servers 124; (iv) one or more VOD servers 125, and (v) consumer premises equipment (CPE) 110. The distribution server(s) 124, VOD servers 125 and CPE(s) 110 are connected via a bearer (e.g., HFC) network 101. A simple architecture comprising one of each of the aforementioned components 122, 123, 124, 125, 110 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1A (described in greater detail below) may be used.

The application origination point 122 comprises any medium that allows an application (such as a data download application or VOD-based application) to be transferred to a distribution server 124. This can include for example an application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The content source 123 may comprise any indigenous (i.e., MSO) or third party provider of content, whether direct or indirect. This content may comprise an MPEG (e.g., MPEG-2, MPEG-4, etc.) stream, or otherwise. The content may also pass through one or more intermediary nodes or conditioning process before transmission over the network 101, as is well understood in the art.

The application distribution server 124 comprises a computer system where such applications can enter the network system. Distribution servers are well known in the networking arts, and accordingly not described further herein.

The VOD server 125 a computer system where on-demand content, as well as the data discussed in greater detail below) can be received from one or more data sources 122 and enter the network system. These sources may generate the content/data locally, or alternatively act as a gateway or intermediary from a distant source. In one embodiment, the VOD server 125 includes the Session Resource Manager (SRM) functionality, and asks the Digital Network Control System (DNCS) for resources. The DNCS responds with negative or positive response to the request, and the VOD server implements the appropriate resource allocation logic. For example, when a new VOD session request is made, the SRM receives that request, allocates bandwidth on a downstream QAM channel, and sends the information back to the CPE that made the request so that it can tune to the correct RF channel and the VOD program therein. Since the SRM controls mapping of incoming VOD session requests to QAM channels within the Service Group, it is an appropriate place for a Cable Operator to enforce RF channel usage and other policies, including CA. In general, SRM should maximize availability of bandwidth to VOD sessions (by efficiently recycling bandwidth from expired sessions) and by ensuring some level of redundancy in case of equipment failure (e.g. a QAM modulator fails).

It will be appreciated that while several exemplary embodiment of the invention are described in the content of an SRM closely associated with a VOD server, (i) the SRM may be located outside of or at a location separate from the VOD server (such as, e.g., on a LAN or WAN in data communication with the VOD server or its proxy); and (ii) one or more entities other than an SRM may be used to provide the described functionality. See, e.g., the discussion of the broadcast switched architecture (BSA) embodiments described subsequently herein.

The CPE 110 includes any equipment in the "customers' premises" (or other locations, whether local or remote to the distribution server 104) that can be accessed by a distribution server 104. Such CPE 110 comprise processors and associated computer memory (and optionally mass storage) adapted to store and run the downloaded or resident application, as well as receive and store the streamed in-band content and data. In the present context, at least a portion of the CPE application necessary to facilitate conditional access can itself be downloaded to the CPE 110, wherein the latter executes the downloaded application(s)/components in order to enable the CPE to receive appropriate types of data, although it will be recognized that the application(s) may also be resident on the CPE before download, received from another source (such as a third party Internet site, CD-ROM, etc.).

Figure 1A:
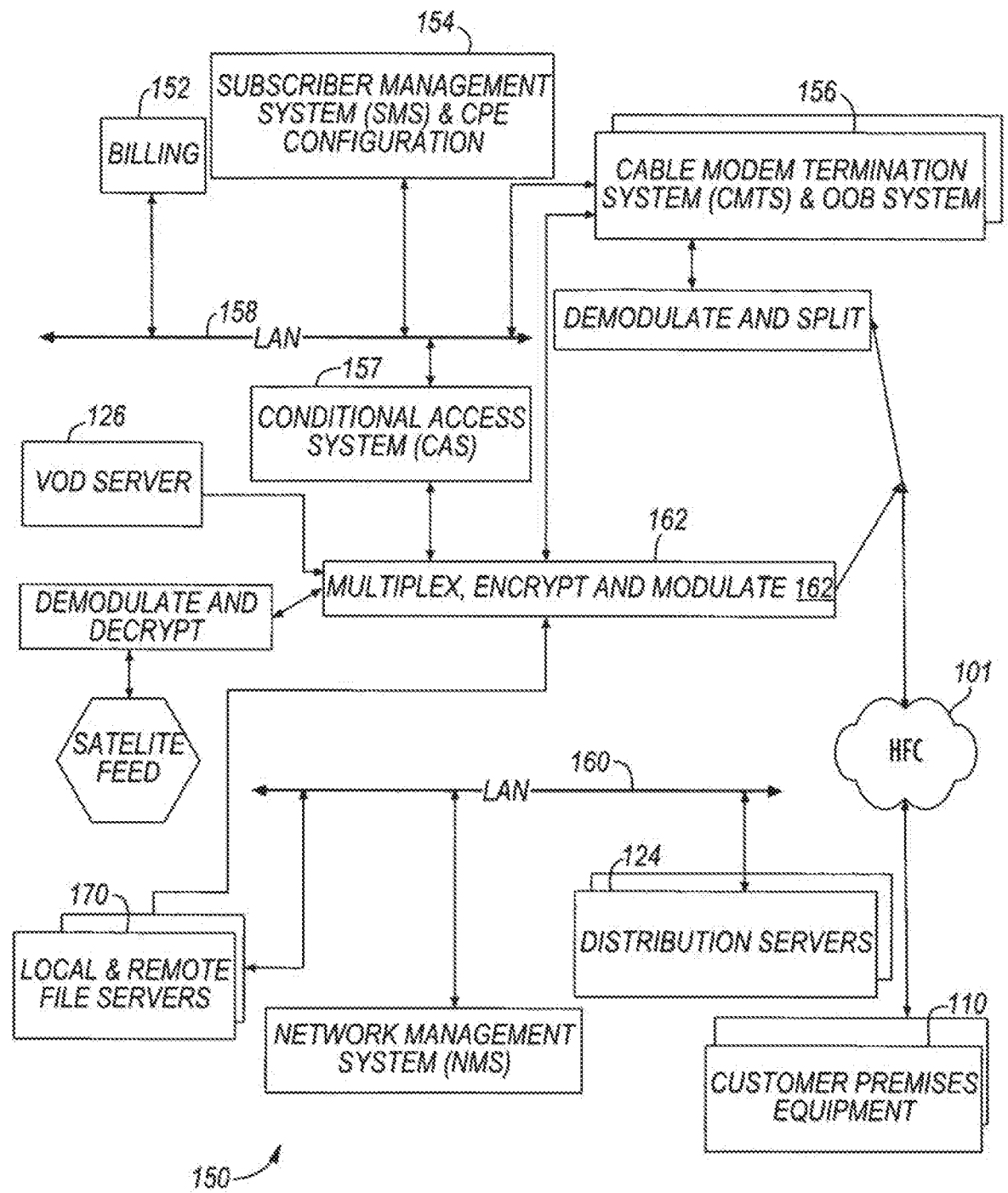
FIG. 1A is a functional block diagram illustrating one exemplary headend configuration of an HFC network useful with the present invention.

Referring now to FIG. 1A, one exemplary embodiment of a headend architecture useful with the present invention is described. As shown in FIG. 1A, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1A is high-level, conceptual architecture and that each MSO may have multiple headends deployed using custom architectures.

Figure 1B:
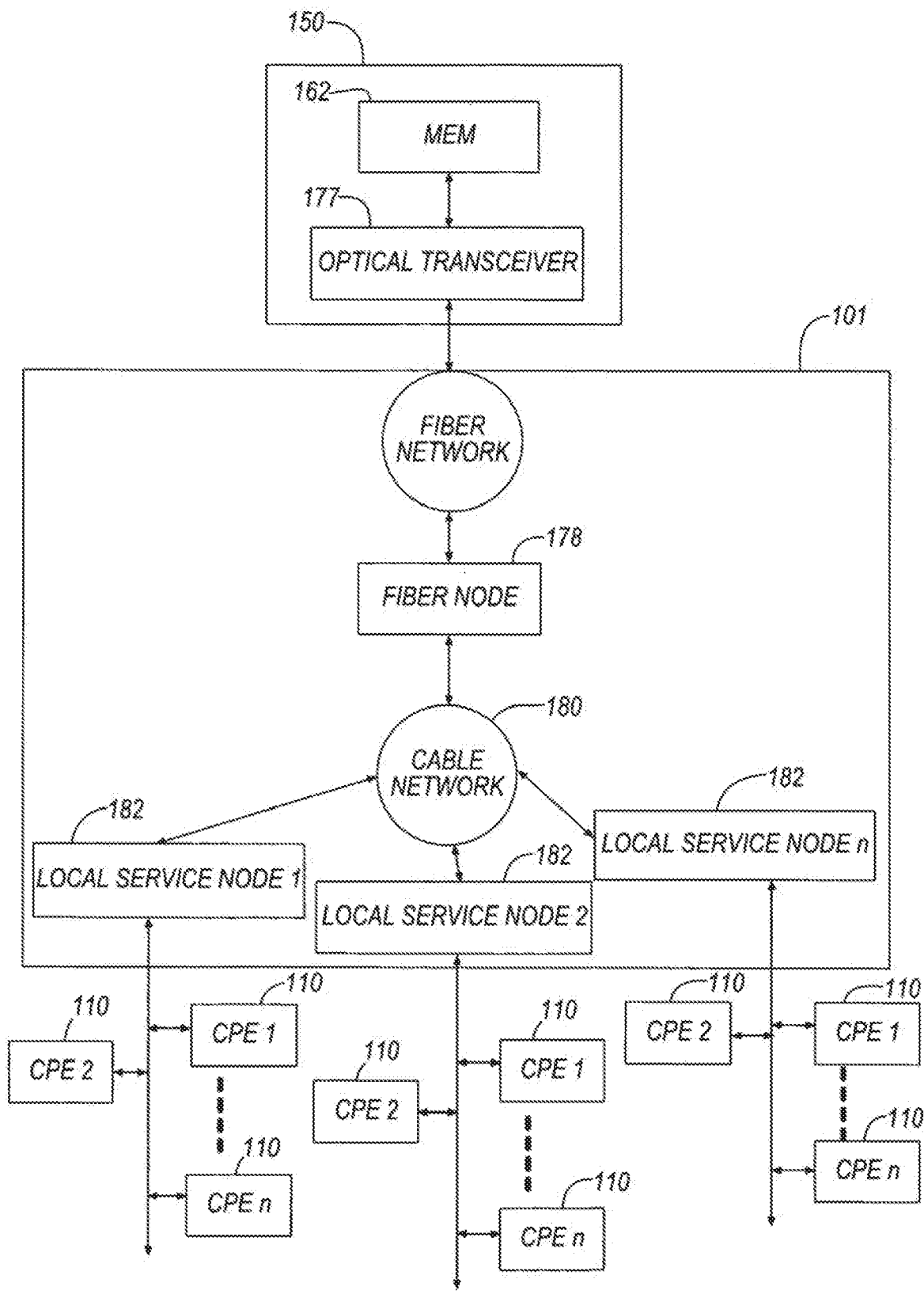
FIG. 1B is a functional block diagram illustrating one exemplary content distribution network showing local service nodes useful with the present invention.

The exemplary architecture 150 of FIG. 1A further includes a multiplexer/encrypter/modulator (MEM) 162 coupled to the HFC network 101 adapted to "condition" content for transmission over the network. In the present context, the distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 110 ("downstream") are multiplexed together in the headend and sent to neighborhood hubs (FIG. 1B).

Content (e.g., audio, video, etc.) is provided in each downstream (in-band) channel associated with the relevant service group. To communicate with the headend, the CPE 110 uses the OOB or DOCSIS channels and associated protocols. The OCAP 1.0 specification provides for networking protocols both downstream and upstream, although other protocols and specifications may be used.

The transmission channels from the head end to the CPE may be 6 MHz bands populating a forward passband, e.g., 350-750 MHz band, of a coaxial cable, which is allocated for downstream communication from headend 105 to a set top terminal. The use of other channel bandwidths and frequencies is also consistent with the present invention.

It should be noted at this point that the term "transmission channel" is to be distinguished with a "program channel." A "transmission channel" signifies a designated frequency band through which a transport stream containing broadcast programs is transmitted. On the other hand, a "program channel" signifies the source of the program material selected by a user to view. For example, a user may select program channel 2 to view program material provided by CBS, program channel 14 to view program material provided by ESPN; program channel 32 to view program material provided by MTV, and so forth.

Upstream data from a set top or other device to the headend 150 may be communicated via a reverse passband, e.g., 5-40 MHz band, of a coaxial cable. The reverse passband comprises reverse data channels (RDCs) having a 1 MHz bandwidth in this instance, through which quaternary phase shift keying (QPSK) signals containing upstream data are transmitted. It should be noted that the 1 MHz bandwidth allocated for an RDC here is for illustrative purposes only.

FIG. 1B illustrates one embodiment of the HFC network of FIG. 1 previously described, and the relationships of the various components including the MEM 162 and optical transceiver 172 (located typically at the headend 150), the fiber network and fiber node(s) 178, and the cable (e.g., coaxial) network 180, as well as the various local service nodes or hubs 182.

"Switched" Networks—

Figure 1C:
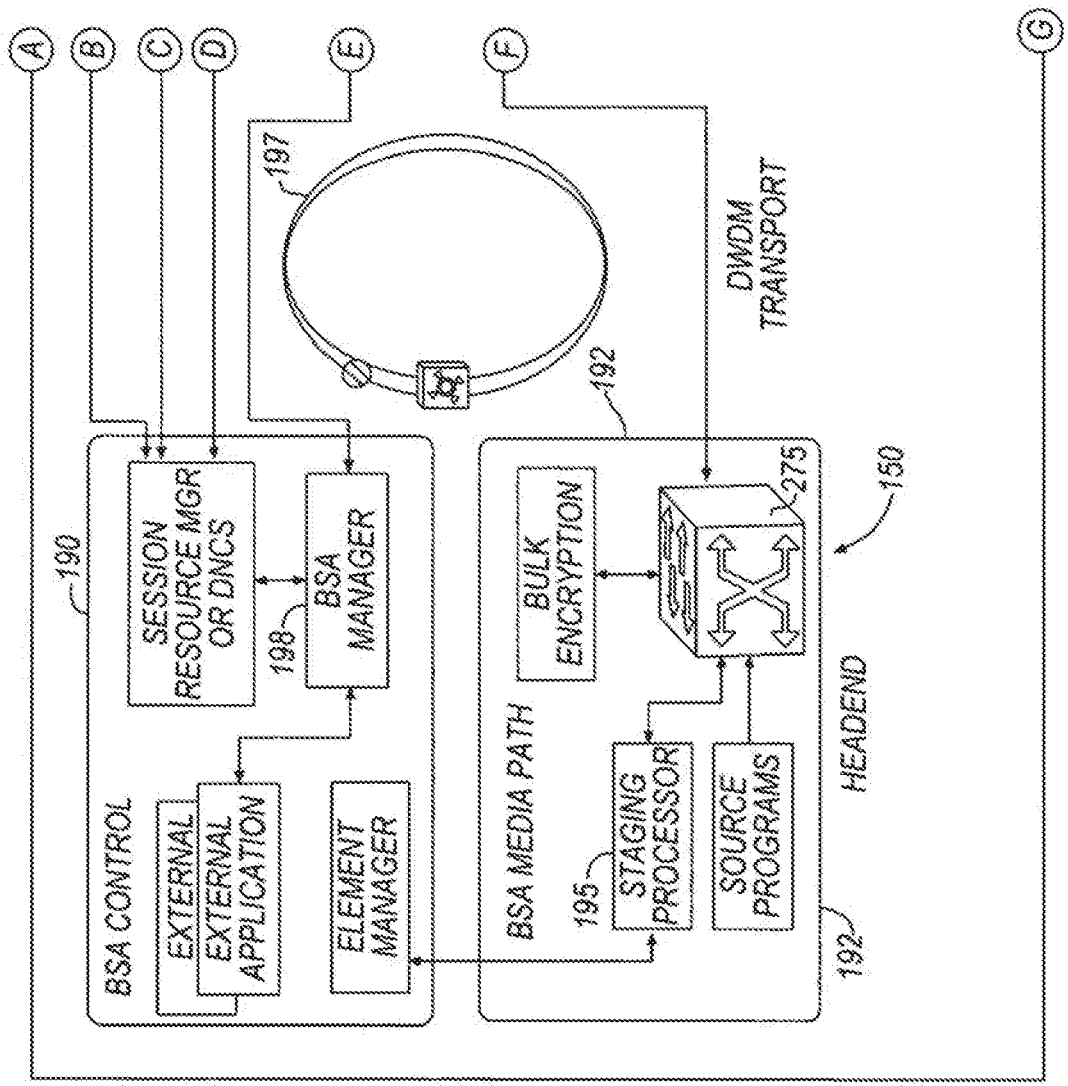
FIG. 1C is a functional block diagram illustrating one exemplary broadcast switched architecture (BSA) network useful with the present invention.
Figure 1C:
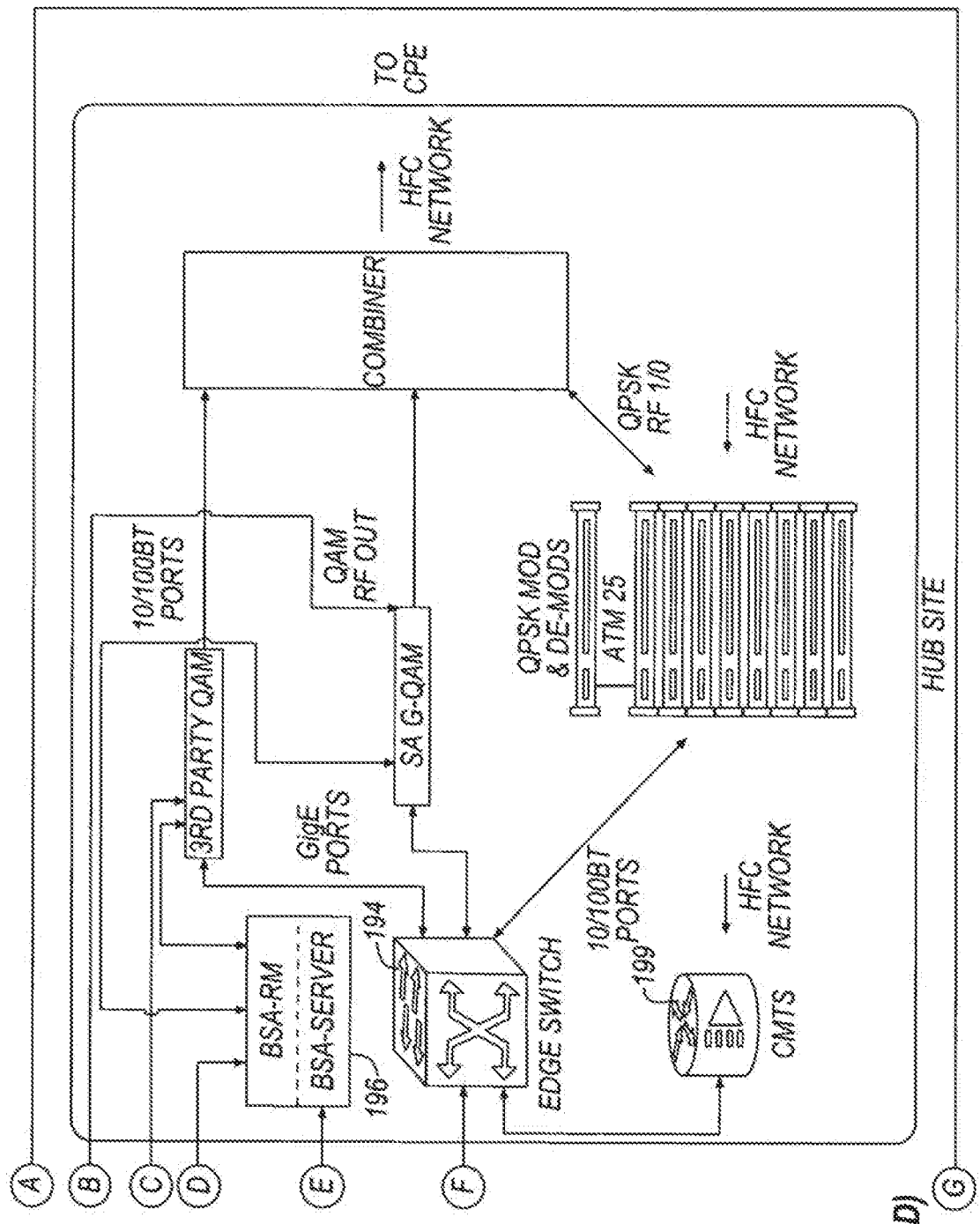

FIG. 1C illustrates exemplary switched network architecture (e.g., broadcast switched architecture or BSA) also useful with the apparatus and features of the present invention. While various embodiments of the present invention are illustrated in the context of unswitched (e.g., conventional) or BSA paradigms, it will be recognized that the present invention is in no way limited to any architecture, and in fact can be used with many other types of content delivery systems.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1C shows the implementation details of one exemplary embodiment of this broadcast switched network architecture. Specifically, the headend 150 contains switched broadcast control and media path functions 190, 192; these elements cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 (which may be part of the fiber network shown in FIG. 1B discussed above) is utilized to distribute the dense wave-division multiplexed (DWDM) optical signals to each hub in an efficient fashion.

Co-owned U.S. patent application Ser. No. 09/956,688 filed Sep. 20, 2001 entitled "TECHNIQUE FOR EFFECTIVELY PROVIDING PROGRAM MATERIAL IN A CABLE TELEVISION SYSTEM", and issued as U.S. Pat. No. 8,713,623 on Apr. 29, 2014, incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1-1C also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1C, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE 110. The IP packets are typically transmitted on RF channels that are different that the RF channels used for the broadcast video and audio programming, although this is not a requirement. The CPE 110 are each configured to monitor the particular assigned RF channel (such as via a port or socket ID/address, or other such mechanism) for IP packets intended for the subscriber premises/address that they serve.

Program Insertion Device—

Figure 2A:
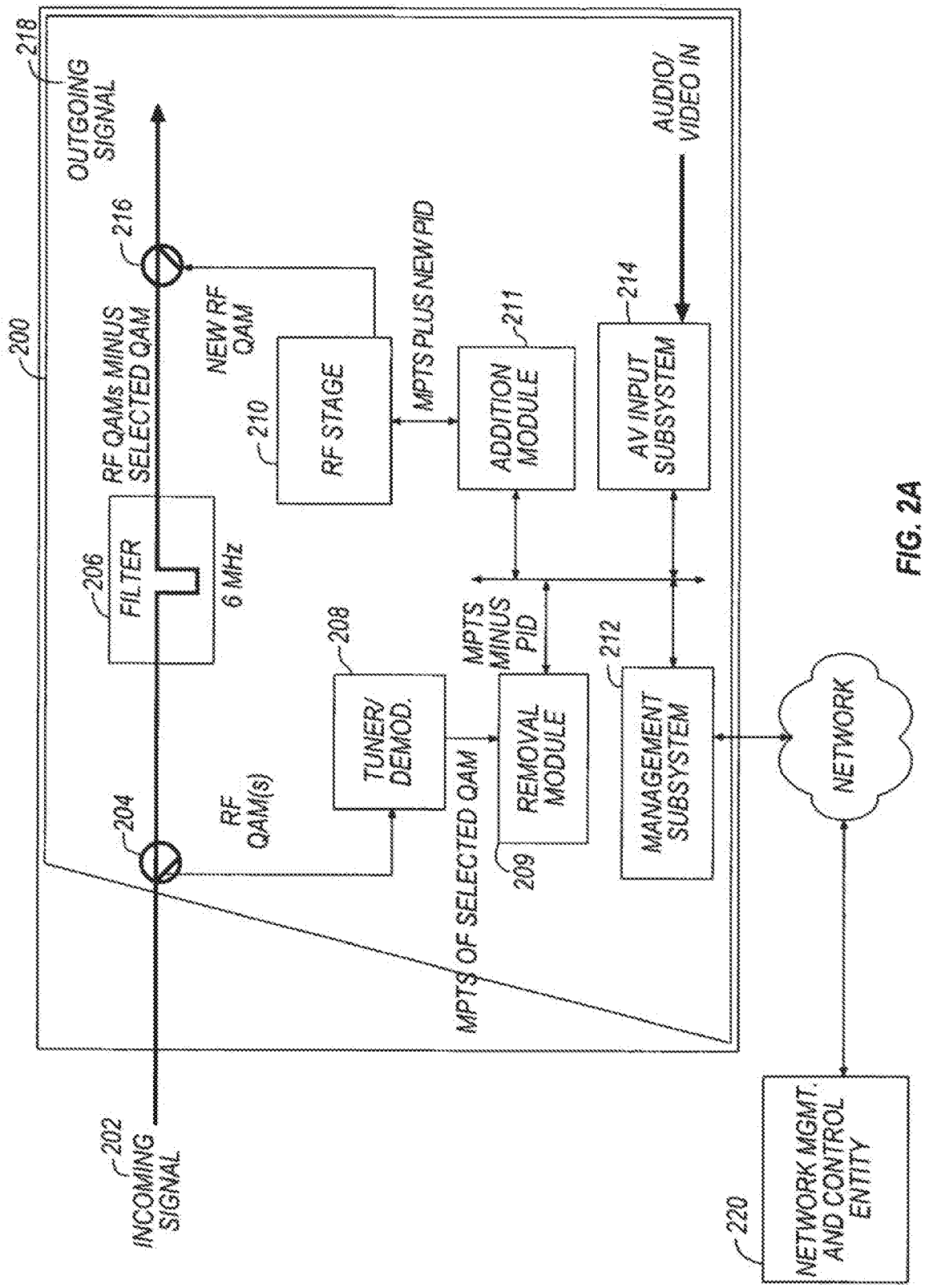
FIG. 2A is a functional block diagram of one exemplary program insertion device in accordance with a first embodiment of the present invention.

Referring now to FIG. 2A, one exemplary embodiment of the program insertion device (also colloquially referred to as an "add/drop device") of the present invention is described in detail. The program insertion device 200 may be located at a local service node or hub 182 or BSA switching node, and may receive a signal comprising one or more multi-program transport streams (MPTSs) 202 in the form of multi-channel RF signals (e.g., 64- or 256-QAM 6 MHz channels). As described in greater detail below with respect to FIGS. 3-3B, the incoming signal is replicated or alternatively split using a replicator or splitter 204; the relevant output of this device 204 may comprise a complete copy of the incoming signal (e.g., a plurality of QAMs) or a single isolated QAM (or group of QAMs), respectively, depending which approach is used. For instance, if a replication or copy device is used (i.e., one that simply produces a copy of the incoming signal), then the output would be two complete copies of the incoming signal. Alternatively, if a splitter is used (e.g., a device that splits a portion of the frequency spectrum off from the parent or incoming signal), then the output of that device would be (i) the split-off portion of the signal into which the local signals are to be inserted, and (ii) the remainder of the original signal. It is noted that placement of the insertion apparatus 200 at, for example, a local distribution hub of the network (i.e., at or near the network edge), will substantially obviate the need to backhaul or otherwise provide the analog signals to the headend or other portion of the network core.

The replicator/splitter output is then input to an RF tuner and demodulator 208, which allows the device 200 to tune to the appropriate QAM(s) of interest an demodulate that signal (including any A/D conversion and frequency downconversion that may be required).

The device 200 of FIG. 2A also includes a removal module 209, and an addition module 211. The removal module includes in one embodiment a program ID (PID) filter which allows for identification and removal of one or more program streams (e.g., SPTSs) based on their PID. For instance, the MPEG-2 packets associated with a given PID can be simply dropped from the incoming MPTS, thereby leaving a "sparse" or space-available version of the MPTS.

Conversely, the addition module 211 inserts the digital encoded (e.g., MPEG-2 encoded) packet stream or SPTS derived from the analog input into the space created by the operation of the removal module 209 previously described. This insertion may, depending on the nature and parameters of the SPTS to be inserted, include rate-shaping and multiplexing of the SPTS (and the other remaining or non-removed components of the ingested MPTS). For example, in the case of a variable bitrate (VBR) encoder output, a statistical multiplexing algorithm is utilized within the addition module 211 so as to generate a new MPTS. Alternatively, the aforementioned statistical multiplexing can be obviated if the SPTS is "bit stuffed" up to a constant target bitrate (CBR).

It is noted that removal of the PID requires demodulation to its transport stream multiplex; however, there is no need to demultiplex prior to the addition of the digital encoded packet stream. It should also be noted that the present invention utilizes decompression of the transport stream multiplex at the physical layer.

The device 200 of FIG. 2A also includes an RF stage (e.g., frequency upconverter, QAM modulator, and D/A converter) 210, a management subsystem 212, and an audio-video (AV) input subsystem 214, all of which are communicatively connected to each other as shown in FIG. 2. These subsystems are now described in greater detail.

The management subsystem 212 is in communication with a network control system or other network entity 220 via the RF input or another network interface, and allows for remote control, management and provisioning, as well as software/firmware upgrades to the device 200. In one variant, the management interface comprises a data over cable service interface specification (DOCSIS) subsystem, although other approaches may be used (e.g., Ethernet over RJ-45, etc.). Use of the DOCSIS interface advantageously allows management and control messages (described below in greater detail) to be sent between the insertion device 200 and the management entity 220 over the extant RF cable interface (i.e., using DOCSIS QAMs), thereby obviating additional communication channels.

The AV input subsystem 214 is configured to accept analog audio/video input corresponding to local (e.g., PEG) programming. This input may come from any number of sources including those at the premises where the insertion device 200 is located (e.g., security camera feeds), and may also comprise multiple different inputs which may require simultaneous processing.

The RF stage 210 outputs a modulated (e.g., 64- or 256-QAM) and upconverted (and optionally multiplexed) signal that carries the inserted analog content. It will be recognized that the output of the RF stage may be analog in form (i.e., the RF channel carrier is analog for carriage over the RF coaxial cable; hence the RF stage 210 may employ a D/A converter to generate the carrier); however, this is to be distinguished from the encoding of the inserted content, which is digital. The output of the RF stage 210 is input to a combiner 216 for combination with the relevant portion of the incoming signal, the latter which may be either (i) the incoming signal which has been filtered using a notch or other such filter device 206 to remove the QAM(s) of interest (so that that the new reinserted QAM which includes the inserted digitally encoded analog content does not map on top of the original QAM), or (ii) the remainder of the "split" incoming signal (i.e., the original incoming signal, less the QAM(s) of interest which were split off the original signal). This combination process produces an output signal 218, which in either case (i) or (ii) above, comprises a "whole" signal that includes substantially all of the original signal, yet with one or more incoming program streams/SPTSs (associated with one or more respective PIDs) removed, and the new digitally-encoded analog feed inserted as a new SPTS instead.

It will be recognized that the exemplary insertion device 200 also provides the advantage of simple management of the channel map information that must be delivered to the DSTB via an application to associate a display channel and other data (i.e., guide data, channel name, etc.) to tuning parameters such as QAM frequency and PID. For example, a network operator (e.g., MSO) can use the same QAM and frequency parameters delivered in a single channel map to associate different local programming content to the same display channel (e.g., "Ch. 300 Local) across multiple insertion devices. Put another way, a single channel map can be used throughout the system where a given QAM frequency/PID combination always associates to the locally inserted content through the device 200. Therefore, the application can always associate a given channel (i.e., 300) to generic guide data (i.e., local programming), thereby avoiding complex mapping tables or conversions.

Figure 2B:
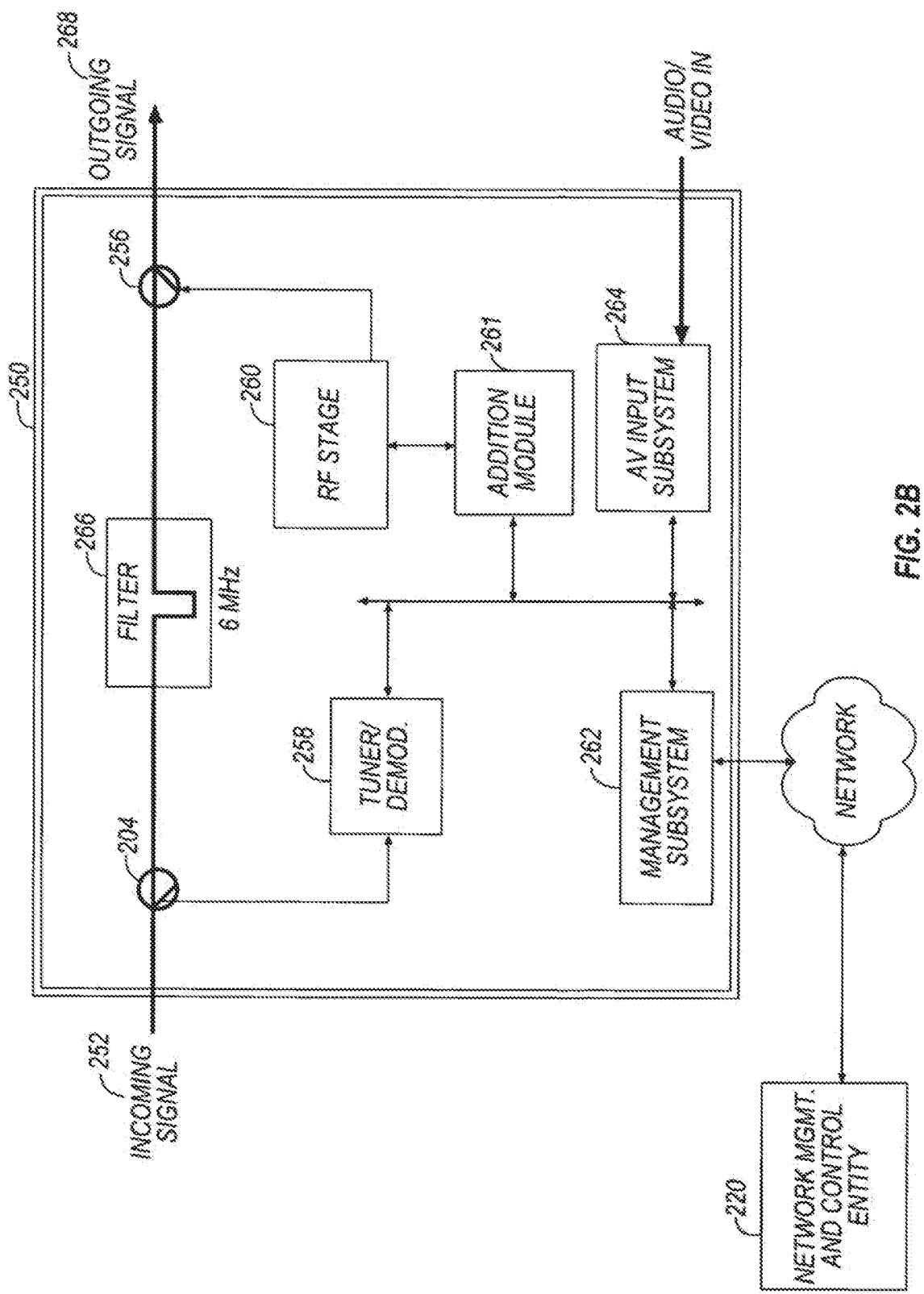
FIG. 2B is a functional block diagram of a second exemplary embodiment of the program insertion device.

Referring now to FIG. 2B, another embodiment of the insertion device 250 of the invention is described. As illustrated in FIG. 2B, this embodiment is generally similar to that of FIG. 2A discussed above (including filter 266, RF stage 260, addition module 261, management subsystem 262, and AV input subsystem 264); however, the insertion device 250 is adapted to perform insertion of the digitally encoded analog stream or SPTS into a QAM 252 that already has space available (i.e., no removal of one or more existing SPTSs within the QAM is required). Specifically, the device 250 of FIG. 2B has no removal module 209, since the space within the MPTS already exists.

Figure 2C:
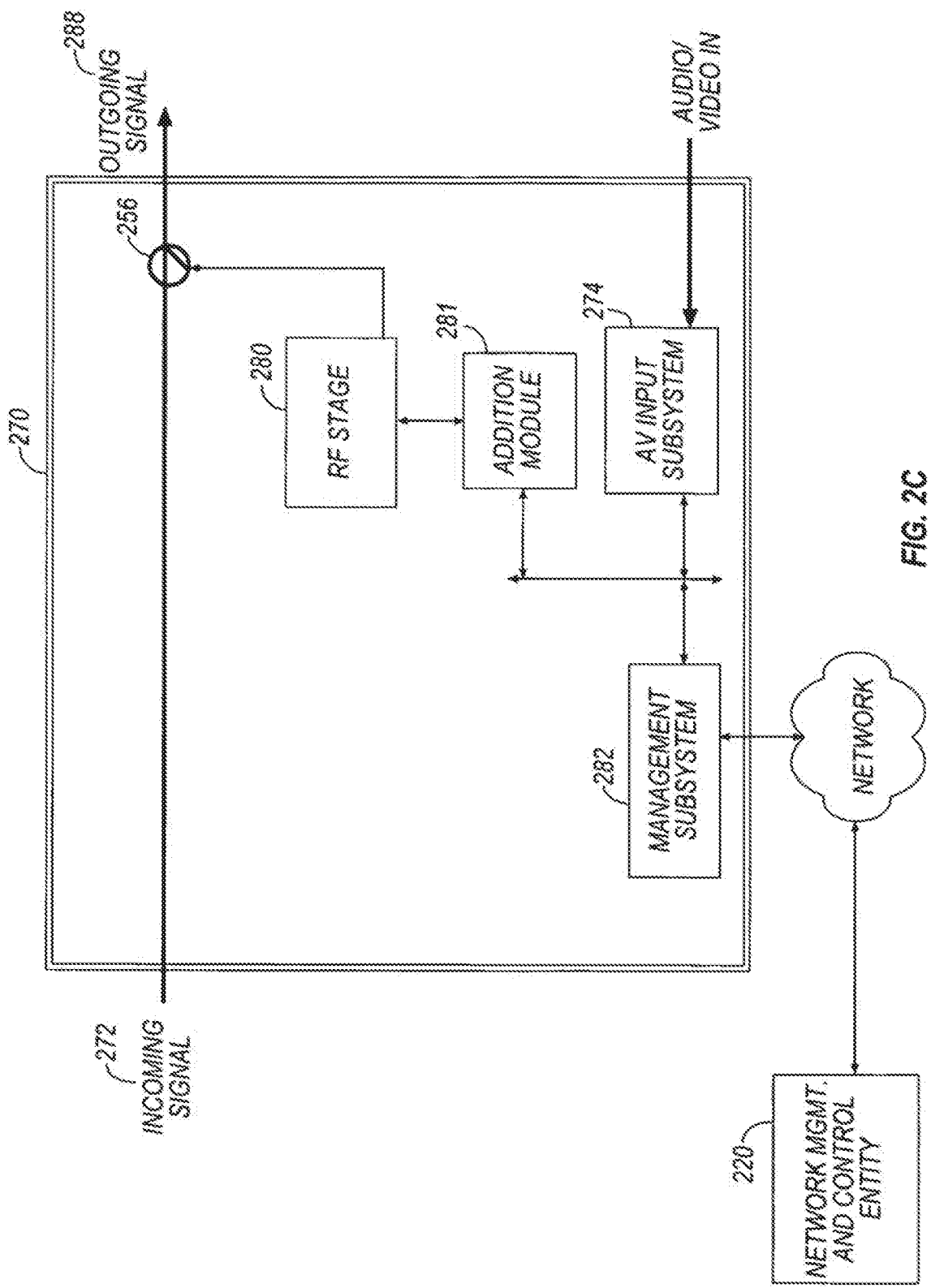
FIG. 2C is a functional block diagram of a third exemplary embodiment of the program insertion device.

In the embodiment of FIG. 2C, the insertion device 270 is adapted to effectively create and insert its own QAM from scratch, and hence no splitter/isolator 204, tuner stage 208 or removal module 209 is required. Rather, the incoming signal 272 merely has an empty RF 6 MHz spacing within its frequency spectrum, which the insertion device 270 exploits to insert its own QAM-modulated signal. Specifically, the analog local content stream is digitally encoded via the AV input subsystem 274, and the addition module 281 combines this signal with any others (such as where multiple analog signals need to be inserted) to form a transport multiplex. A PID for each stream is assigned as required, and the multiplex is upconverted, QAM-modulated, D/A converted in the RF stage 280, and then combined with the incoming (downstream) transport 272 using the combiner 286 to produce the combined output 288.

The exemplary insertion devices shown in FIGS. 2A-2C may be implemented as a circuit card used in a general purpose computer (e.g., PC) of the type now ubiquitous in the art having a processor, a mass storage medium, an optical reader device, a signal bus and interface, and so forth. In such an embodiment, the RF signal input from the network may be directly fed to the circuit card via a connector, or may be input to another receiver card and fed to the circuit card over an internal signal bus. Similarly, control messages for the insertion device may be conveyed to the circuit card via the computer's CPU, or via communication with another card or peripheral device communicatively coupled to the computer.

In another embodiment, a set top box-like hardware platform is used as the basis for the insertion device. In this embodiment, the program insertion device may have an analog video input to acquire PEG programming, an RF (e.g., coaxial) connector to receive the RF channel multiplex. The RF connector may be shared to receive network control messages, or the program insertion device may receive its network control messages on a second network interface.

In yet another embodiment, the insertion device 200, 250, 270 may comprise a converged premises device, such as for example that described in co-owned U.S. patent application Ser. No. 11/378,129 filed Mar. 16, 2006 entitled "METHODS AND APPARATUS FOR CENTRALIZED CONTENT AND DATA DELIVERY", and issued as U.S. Pat. No. 8,347,341 on Jan. 1, 2013, incorporated herein by reference in its entirety.

The devices 200, 250, 270 of FIGS. 2A-2C may also be configured with a "point of presence" module that permits interface of a user or operator of the device with a network operator representative or management process. As described elsewhere herein, the devices 200, 250, 270 may be deployed at a subscriber premises (e.g., an apartment building or other multi-user complex (MUC)), and hence it may be advantageous to allow for direct communication between the device operator and the network operator.

Methods—

Figure 3:
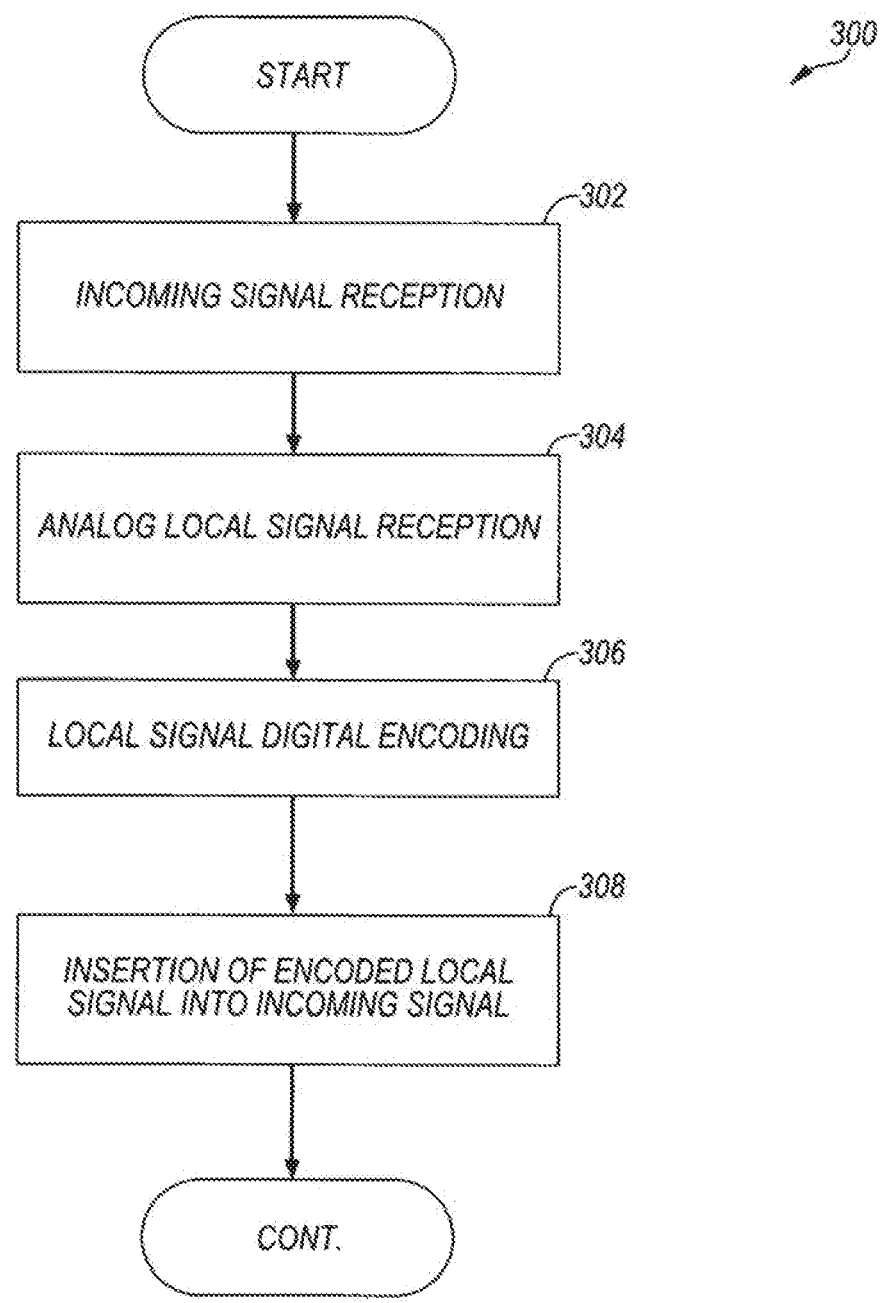
FIG. 3 is a logical flowchart illustrating one embodiment of the generalized methodology of local content insertion according to the present invention.

Referring now to FIG. 3, one exemplary embodiment of the generalized methodology of local (e.g., PEG) content insertion is described. Note that the various steps described in the Figures discussed below are organized as a sequence of steps only for the ease of explanation. Various embodiments may implement some or all of these steps concurrently, or on different orders as applicable.

As shown in FIG. 3, the exemplary method 300 comprises first receiving a digital content channel (step 302). In one variant, this channel comprises a digitally encoded QAM-256 radio frequency channel, such as may be used with a cable or satellite network. The selected channel may be a channel at a predetermined fixed frequency or may be communicated to the insertion apparatus 200 via a network control message. If a content delivery network has multiple hubs, the selected channel at each hub may be at the same RF frequency or may be at a different RF frequency.

Next, per step 304, an analog signal is received. This may comprise for example an analog local feed (e.g., PEG, security video camera feed, etc.) as previously described. Per step 306, the analog signal is digitally encoded in a suitable format; e.g., one that facilitates subsequent decoding by a receiver at a subscriber premises. Any number of compressed, lossy or non-lossy encoding (codec) schemes may be used for example, such as MPEG-2, MPEG-4, WMP, H.264, etc.

Lastly, per step 308, the digital encoded content (e.g., encoded content bitstream) is inserted into the received content channel. In the various different embodiments of the invention, such insertion may comprise for example: (i) allocating or leaving space for the encoded content stream when the digital content channel (multiplex) is created; (ii) removing content within the received channel, and replacing it with the digitally encoded analog content of the same or less bitrate; or (iii) inserting the digitally encoded content opportunistically when sufficient bandwidth is present (although this may result in discontinuities in the program stream, unless the content is delivered in non-real time; e.g., buffered at the receiver or another downstream node). Similarly, the insertion apparatus may buffer the analog (or digitally encoded analog) content until a sufficient bandwidth surplus is projected or determined to exist for a period sufficient to complete the transmission of the encoded content according to any prevailing QoS or timeliness requirements. Yet other approaches will be recognized by those of ordinary skill given the present disclosure.

Figure 3A:
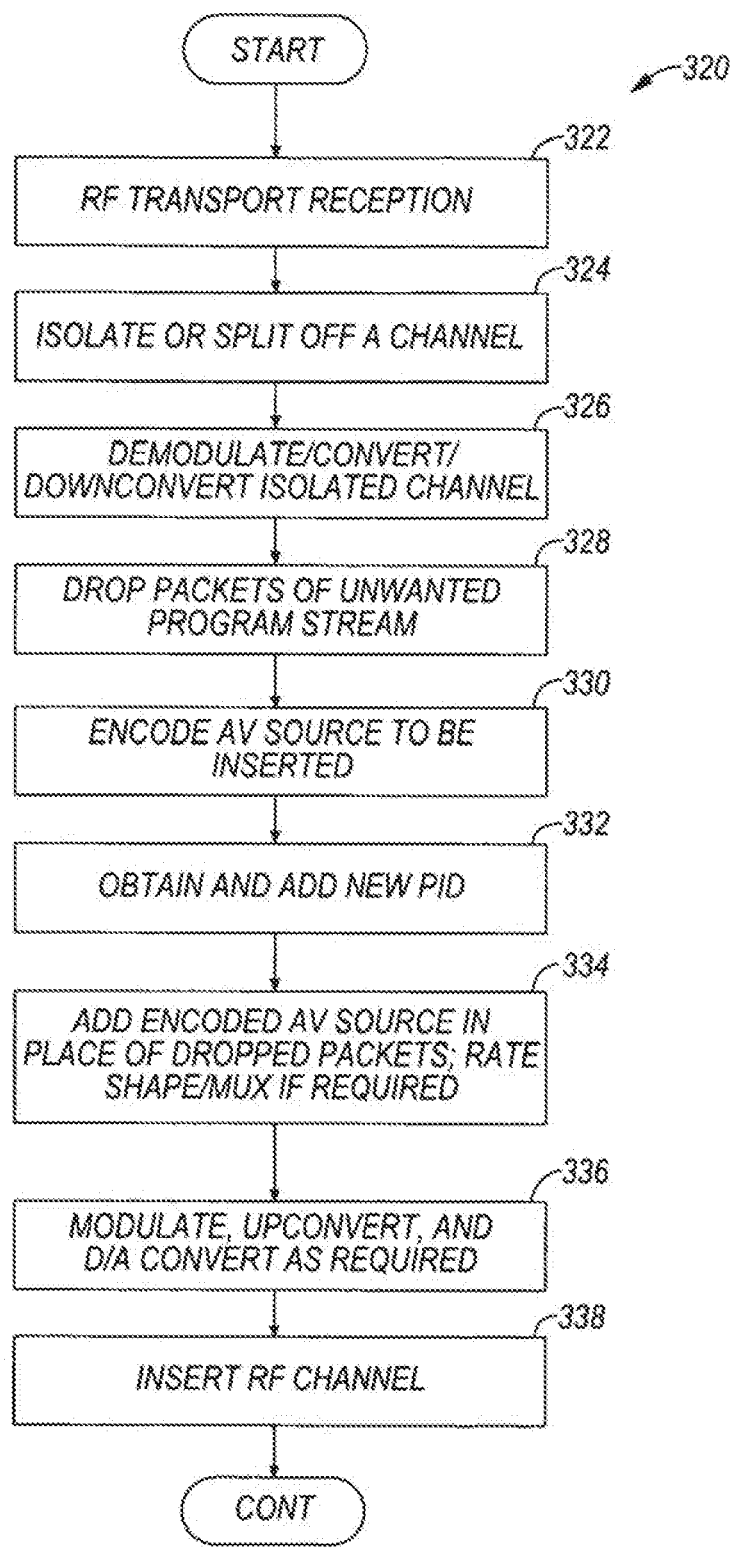
FIG. 3A is a logical flowchart illustrating one exemplary implementation of the generalized method of FIG. 3.

FIG. 3A is a flowchart 320 showing exemplary steps of one implementation of the method of insertion of content according to FIG. 3.

Per step 322, a group of one or more RF channels are received at a hub as part of an RF transport. For example, in U.S. cable television network, the RF channels may be organized as 6 MHz wide channels spaced between 50-864 MHz frequencies.

In step 324, a selected channel is split or isolated from the group of one or more RF channels received. This may occur under any number of different approaches, including for example: (i) tuning to the channel (e.g., QAM) of interest to obtain the information carried on that QAM for use by the insertion device 200, and subsequent filtering (e.g., via notch filter) of the same QAM in the parent signal so as to effectively remove the QAM in preparation for reinsertion of a modified version of that QAM after analog content insertion); or (ii) splitting the QAM of interest from the parent signal, and then recombination of the modified QAM with the parent. Yet other approaches will be recognized by those of ordinary skill given the present disclosure.

In the first variant (i) above, an RF tuner is used to tune to and receive the radio frequency channel (e.g., 6 MHz QAM) of interest. The QAM information is then in effect "picked off" from the relevant carrier, the latter which is maintained as part of the downstream signal. Accordingly, to avoid inserting the second signal at that frequency (i.e., that including the inserted digitally encoded analog signal) atop the original signal on that QAM, the tuned-to QAM is then filtered using e.g., a notch filter of the type well known in the electronic arts, thereby removing the original signal on that QAM from the downstream signal (i.e., aggregate of QAMs).

In the second variant (ii) above, the splitting may be accomplished using a frequency domain splitter that takes an RF input, and produces two outputs: the group of RF channels without the selected channel being available on one output, and the selected channel being available on the other output.

In the next step 326, the selected and isolated channel is A/D converted, downconverted in frequency (if required), and demodulated to produce a digital stream of content. For example, in a digital cable network, the RF channel may comprise an analog-domain QAM modulated RF signal, and the demodulation may comprise a Quadrature Amplitude Modulation (QAM) demodulator that operates on an intermediate frequency (IF) after downconversion, and the output may comprise a digital domain MPEG-2 multiplexed transport stream (MPTS).

The digital transport stream is then processed in step 328 to drop packets corresponding to one or more unwanted program streams. The unwanted program(s) may be known a priori, may be identified by a network control message (e.g., sent from the upstream multiplexer or headend process), or may be identified by information contained within the digital transport stream itself in the form of identification bits or fields of a channel map table. Yet other approaches may be used as well, consistent with the present invention. When packets corresponding to the unwanted program stream(s) are dropped from the received and demodulated transport stream, it creates a "sparse" or space-available transport stream to which replacement program packets can be added.

In step 330, analog signal (e.g., PEG program material) in the form of an audio-visual (AV) source is encoded from analog input format to the format suitable for insertion in the sparse transport stream. The encoding may be performed using video and audio compression algorithms that are similar to the encoding of the other content within the sparse transport stream (e.g., MPEG-2 format), or the encoding may be performed using a different compression algorithm (e.g., MPEG-4/H.264 or VC-1 encoding algorithm).

It is noted that in one embodiment, there is no requirement that the QAM be demultiplexed prior to dropping the packets for the unwanted program streams and/or prior to the insertion of the digital encoded packet stream.

In step 332 the existing PID is assigned and included on the channel map. In step 334, the encoded analog signal (single program transport stream, or SPTS) is added to the sparse transport stream via physical insertion of the SPTS into a target QAM. The physical addition of this signal may also require rate-shaping. Rate shaping in this context refers to processing of the content from the encoded analog stream (and/or the sparse stream content) such that the combined total bitrate meets a target rate suitable for insertion back into the group of RF channels. This process may be a constant bitrate (CBR), or a variable rate (VBR) process. For example, in the case of a VBR stream, rate shaping may comprise using a statistical multiplexing technique in conjunction with a quantizer or transcoder function such as that described in co-owned U.S. patent application Ser. No. 11/048,334 filed Feb. 1, 2005 entitled "APPARATUS AND METHODS FOR MULTI-STAGE MULTIPLEXING IN A NETWORK", and issued as U.S. Pat. No. 7,602,820 on Oct. 13, 2009, incorporated herein by reference in its entirety. The additional streams which are multiplexed into the analog stream may comprise the dropped packets of step 328 which correspond to one or more unwanted program streams. In the case of a CBR, the VBR stream is bit-stuffed up to the desired constant bitrate using well known stuffing techniques, which accordingly are not described further herein.

The rate-shaped (and multiplexed if applicable) transport stream is then modulated, upconverted and D/A converted as required in step 336 to produce a single RF channel signal that can then per step 338 be inserted back into or combined with the group of channels (QAMs) without the selected channel, thereby producing a complete group of output RF channels, one of which includes the digitally encoded analog signal.

In addition to encoding and insertion of audio-video PEG or local programming, other data such as closed captioning (CC) or emergency alert information (e.g., EAMs) may also be inserted in the method. See, e.g., co-owned U.S. patent application Ser. No. 11/298,247 filed Dec. 9, 2005 entitled "CAPTION DATA DELIVERY APPARATUS AND METHODS", and issued as U.S. Pat. No. 8,566,887 on Oct. 22, 2013, U.S. patent application Ser. No. 11/299,169 also filed Dec. 9, 2005 entitled "EMERGENCY ALERT DATA DELIVERY APPARATUS AND METHODS", and issued as U.S. Pat. No. 7,592,912 on Sep. 22, 2009, and U.S. patent application Ser. No. 12/079,781 filed Mar. 27, 2008 entitled "METHODS AND APPARATUS FOR CENTRALIZED AND DECENTRALIZED EMERGENCY ALERT MESSAGING", and issued as U.S. Pat. No. 8,095,610 on Jan. 10, 2012, each of the foregoing incorporated herein by reference in its entirety.

Figure 3B:
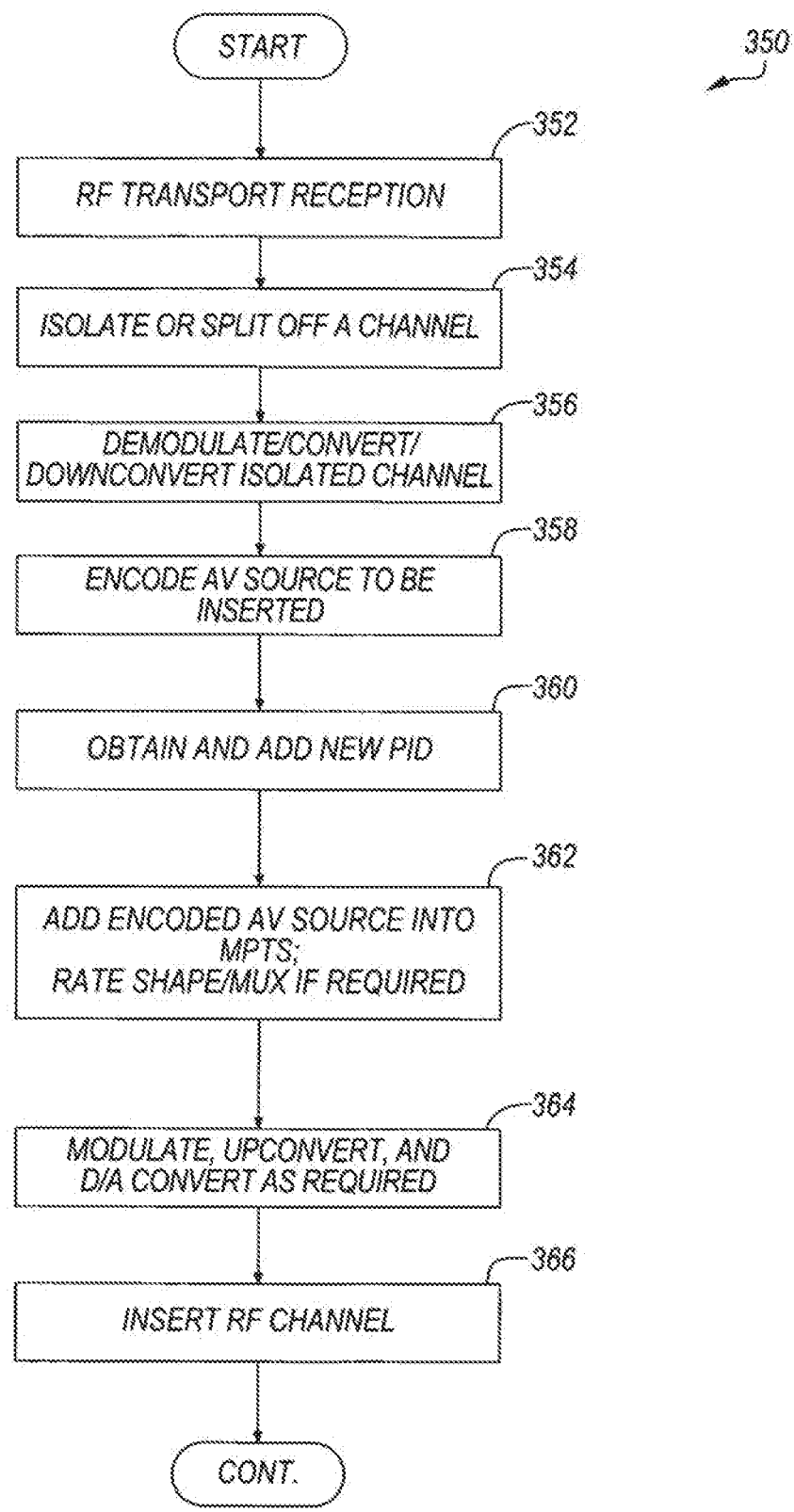
FIG. 3B is a logical flowchart illustrating a second exemplary implementation of the generalized method of FIG. 3.

FIG. 3B is a flowchart 350 showing exemplary steps of a second implementation of the method of insertion of content according to FIG. 3. In this implementation, space for the encoded analog bitstream is reserved within the downstream signal, thereby substantially obviating the need for the insertion apparatus to identify and remove a program stream using a PID.

As shown in FIG. 3B, the first step 352 of the method 350 comprises receiving a downstream signal which may comprise, for example, a plurality of multiplexed transport streams disposed on respective ones of a plurality of 6 MHz QAMs. One or more of the QAMs have at least some bandwidth reserved for insertion of the encoded analog (local) signals. In the embodiment of FIG. 3B, it is presumed that an entire 6 MHz 256-QAM is reserved; however, it will be appreciated that other variants of the invention may simply reserve space/bandwidth within an existing MPTS (versus an entire 6 MHz channel).

The "reserved" bandwidth may also be opportunistic in nature; see, e.g., co-owned U.S. patent application Ser. No. 11/291,328 filed Nov. 30, 2005 entitled "APPARATUS AND METHODS FOR UTILIZING VARIABLE RATE PROGRAM STREAMS IN A NETWORK", and issued as U.S. Pat. No. 7,889,765 on Feb. 15, 2011, incorporated herein by reference in its entirety, which discloses inter alia methods and apparatus for use of opportunistic bandwidth such as that created by CBR (constant bitrate) stuffing data removal. In the present context, where the secondary (analog) signals to be inserted have no time-sensitivity or timing-related QoS requirements, such an approach can be employed. This technique has the advantage of not requiring an special behavior or reservation by the multiplexer process or other upstream processing entity; the CBR streams are simply stuffed as usual and transmitted downstream, wherein the insertion apparatus (in concert with a stuffing bit removal process) identify and utilize this bandwidth in an opportunistic fashion.

This space/QAM reservation may also be facilitated by the inclusion of encoded program stream metadata or the like (e.g., generated by the analog signal encoder) which is sent to the statistical multiplexing process upstream of the insertion device 200 so as to inform the multiplexer of the bandwidth requirements of the encoded analog stream.

The received (incoming) signal is then isolated or split as previously described per step 354, and A/D converted, downconverted in frequency and demodulated as required per step 356.

Next, per step 358, the analog signal to be inserted is received and digitally encoded as previously described (see steps 304 and 306 of the method 300 of FIG. 3).

Per step 360, a new PID is generated (or otherwise supplied) and mapped into the channel map, thereby allowing receiving CPE 110 to locate the new PID on the relevant QAM.

In step 362, the encoded analog signal (single program transport stream, or SPTS) is added to the sparse transport stream via physical insertion of the SPTS into a target QAM. Rate shaping is also applied per step 362 if applicable, as previously discussed with respect to FIG. 3A. Statistical multiplexing of the encoded bitstream may also be performed per step 362 if required (e.g., if the bitstream comprises a variable rate bitstream and is to be combined with other streams, such as where multiple analog feeds are simultaneously being inserted).

Next, per step 364 the resulting stream is modulated (e.g., 64- or 256-QAM) and upconverted in frequency to the carrier frequency if required using well known upconversion techniques.

Lastly, per step 366, the upconverted and modulated digital signal is inserted into or combined with the downstream signal of step 352 above.

It will also be appreciated that while various different implementations described above with respect to FIGS. 3-3B may be used in isolation, they may also be used in concert. For example, a given insertion device may include the capability to perform two or more of the different insertion techniques, even simultaneously (e.g., on different QAMs of a downstream transport).

Moreover, the present invention contemplates that a dynamic switching model may be implemented, wherein different ones of the foregoing approaches may be used at different times, such as where one offers particular benefits or advantages over the others for a particular operational circumstance. For instance, in a bandwidth-constrained or contentious environment, reservation of an entire QAM for PEG or local content may not be practical (or at least desirable from a network profit/revenue perspective); hence, the PID removal/replacement approach may be more optimal in such cases. Alternatively, in situations such as emergencies, the MSO may want to allocate additional bandwidth to delivering multiple local content streams (whether as a multicast of the same stream, or delivery of several discrete or different streams simultaneously). The insertion apparatus 200, 250, 270 of the invention (or alternatively the management entity 220) may also optionally include algorithms with intelligence to determine an optimal delivery paradigm for the local content and select it dynamically; however, this function may also be performed by a human operator.

Network Control Messages—

The present invention provides for an optional communication channel for control, management and provisioning messaging between the network operator and the program insertion device 200, 250, 270 located for example at a local service node 182 or a MUC. At the physical layer, the control and management communication channel may be embodied as e.g., a DOCSIS, Ethernet/GBE (IEEE-Std. 802.3), FireWire (IEEE-Std. 1394), wireless (e.g., WiFi (IEEE-Std. 802.11) or WiMAX (IEEE-Std. 802.16)), or other channel. At the transport layer, the communication channel may comprise extant DOCSIS, Ethernet, TCP, or network etc. protocol messages, or alternatively may use an operator-specific or proprietary message format. In one embodiment, a digital storage media command and control (DSM-CC), protocol as set forth in Annex B and Part 6 of ISO/IEC 13818-1:2000(E) (which is incorporated herein by reference in its entirety) may be used for transmitting these network control messages; however, it is appreciated that other alternative protocol may be utilized with equal success.

The messages that a network operator may find useful in controlling and managing operation of the program insertion device may include for example those used to: (i) identifying programs to be dropped and replaced by local content (e.g., PIDs of one or more streams to be removed from the multiplex); (ii) information related to bitrates or packet rates of the local program streams to be inserted (e.g., VBR profiles as a function of time, maximum or peak bitrates, etc.), or CBR values to be used; (iii) information related to encryption or other characteristics of the local program streams; (iv) types of encoding or decoding to be applied to certain local program streams; and so on. For instance, the aforementioned bitrate information conveyed by the network operator to the device 200, 250, 270 may be useful for the program insertion device during the rate shaping stage (step 314 of FIG. 3A). Moreover, information regarding encodings and formats (e.g., SD, HD, etc.) can be used to ensure that overall network operational and business goals are met, and that the insertion device does not implement policies which run counter to these goals. See, e.g., co-owned U.S. patent application Ser. No. 11/974,700 filed Oct. 15, 2007 entitled "METHODS AND APPARATUS FOR REVENUE-OPTIMIZED DELIVERY OF CONTENT IN A NETWORK", and issued as U.S. Pat. No. 8,099,757 on Jan. 17, 2012, and U.S. patent application Ser. No. 11/881,034 filed Jul. 24, 2007 entitled "METHODS AND APPARATUS FOR FORMAT SELECTION FOR NETWORK OPTIMIZATION", and issued as U.S. Pat. No. 7,770,200 on Aug. 3, 2010, both incorporated herein by reference in their entirety, for exemplary implementations of the foregoing.

Also, as previously noted, the present invention also contemplates that bitrate information or metadata may be conveyed to an upstream multiplexer in order to make its operation (e.g., rate shaping and statistical muxing operations) more efficient. Hence, the present invention contemplates use of rate shaping or bitrate data in one or both of two multiplexing operations; i.e., (1) at the multiplexer(s) upstream of the insertion device; and/or (2) at the multiplexing process within the insertion device 200, 250, 270 (where used).

Other network control messages may include information regarding maintenance of the program insertion device, authentication or encryption messages (e.g., pursuant to a public/private key encryption exchange), network-wide emergency alert messages delivered from the network, etc.

CPE—

Figure 4:
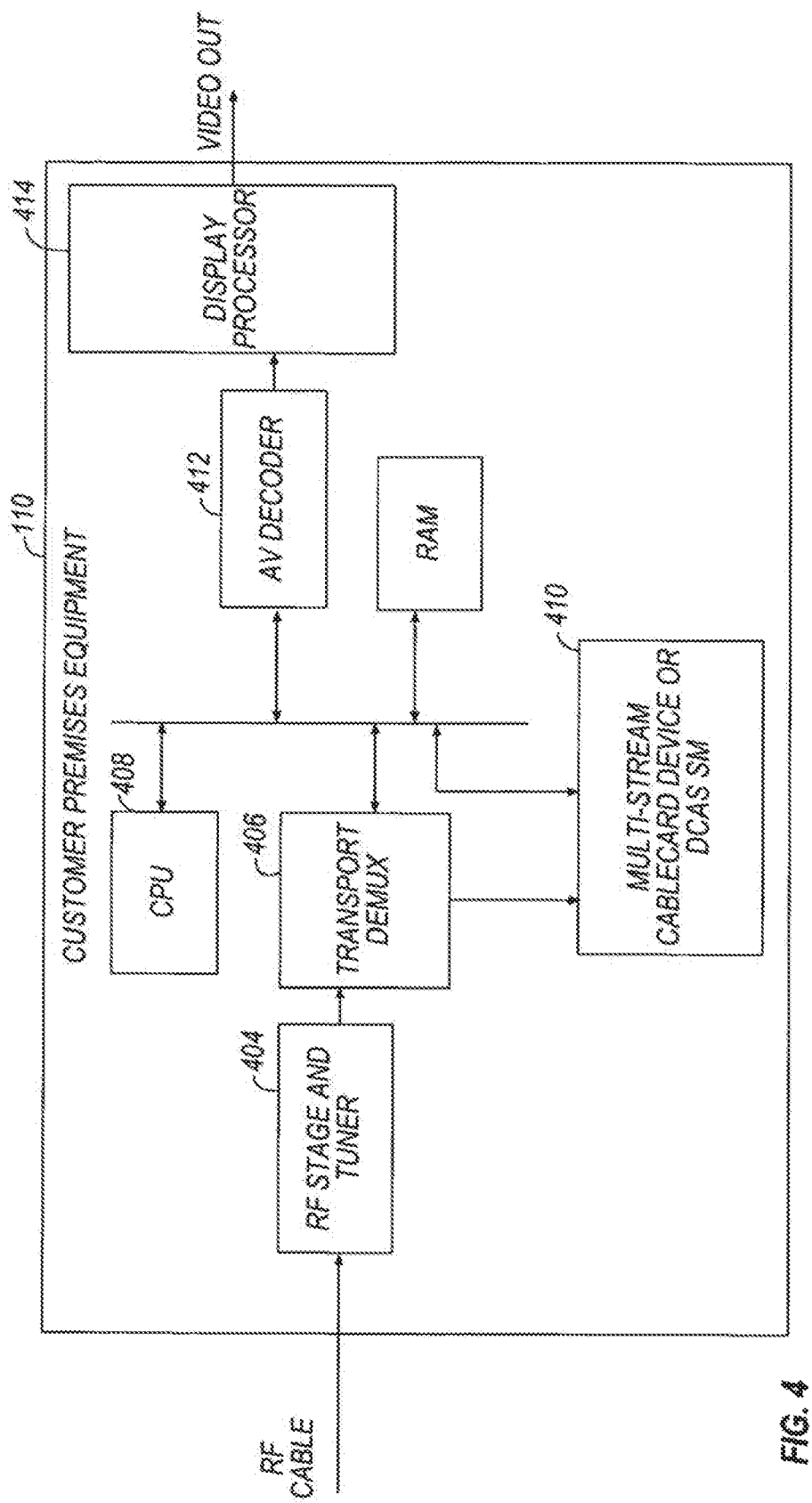
FIG. 4 is a block diagram of an exemplary CPE in accordance with an embodiment of the present invention.

FIG. 4 illustrates an exemplary embodiment of an exemplary CPE 110. It will be appreciated that while the illustrated embodiment of the CPE comprises a digital set top box (DSTB), other types of devices and configurations may be used consistent with the invention.

As shown in FIG. 4, an RF cable drop (e.g., coaxial cable) is connected to an RF receiver stage with tuner 404, which may include for example an A/D converter, demodulator, downconverter, etc. The CPE 110 receives the digital multiplex-carrying signals from the network through the RF cable. The tuner of the RF receiver stage 404 tunes to one QAM (or multiple QAMs; see discussion of wideband tuner variants elsewhere herein) to receive the analog RF carrier (s), demodulate, downconvert (e.g., to an intermediate frequency or IF), and convert the received signals to a digital format that is input to a transport stream demultiplexer 406. The transport stream demultiplexer may be controlled by a CPU 408 and may be instructed to perform selective filtering of programming, based on user inputs (not shown). The transport demux may be connected to a conditional access (CA) decoder such as a multi-stream CableCard™ device 410, or a downloadable CA system (DCAS) such as that described in co-owned U.S. patent application Ser. No. 11/584,208 filed Oct. 20, 2006 entitled "Downloadable Security and Protection Methods and Apparatus", and issued as U.S. Pat. No. 8,520,850 on Aug. 27, 2013, which is incorporated herein by reference in its entirety, that performs decryption operations on the selected program(s). The output of the decryption processing 410, or output of the transport demultiplexer 406, is then fed to an AV decoder 412 to decode the decrypted programs. The AV decoder output is then used by a display processor stage 414 to produce video (and audio) output for the consumer. This output may be in any number of well-known signal formats as can be readily appreciated by one of ordinary skill.

Of significance in the illustrated embodiment is the fact that both the local (e.g., PEG) programming and any other desired programming may be received using the single tuner configuration as shown in FIG. 4. This obviates a NTSC or other tuner adapted to receive analog signals and accordingly providing significant cost savings, as described elsewhere herein.

When a user selects to view local or PEG programming, the CPU may parse through program guide information and instruct the RF stage/tuner 404, the transport demultiplexer 406 and the AV decoder 412 to perform appropriate processing so that the PEG programming is made available to the user on the video output. The CPU may acquire program guide information via an in-band method, wherein the program guide information is carried in the all-digital multiplex, or via an out-of-band method, wherein the information is conveyed to the CPU over another network interface. Other "off-line" means of conveying instructions to locate PEG programming, such as by user input or another communication channel between the CPE 110 and a network entity, are also possible.

In another embodiment, the insertion device 200, 250, 270 may comprise a converged premises device, such as for example that described in co-owned U.S. patent application Ser. No. 11/378,129 filed Mar. 16, 2006 entitled "METHODS AND APPARATUS FOR CENTRALIZED CONTENT AND DATA DELIVERY", and issued as U.S. Pat. No. 8,347,341 on Jan. 1, 2013, incorporated herein by reference in its entirety.

Moreover, the foregoing embodiments of the CPE 110 may utilize any number of other methods and apparatus in conjunction with the functionality previously described herein in order to further extend its capabilities. See, e.g., co-owned U.S. patent application Ser. No. 10/723,959 filed Nov. 24, 2003 entitled "METHODS AND APPARATUS FOR HARDWARE REGISTRATION IN A NETWORK DEVICE"; and issued as U.S. Pat. No. 8,302,111 on Oct. 30, 2012; U.S. patent application Ser. No. 10/773,664 filed Feb. 6, 2004 entitled "METHODS AND APPARATUS FOR DISPLAY ELEMENT MANAGEMENT IN AN INFORMATION NETWORK", and issued as U.S. Pat. No. 9,213,538 on Dec. 15, 2015; and U.S. patent application Ser. No. 10/782,680 filed Feb. 18, 2004 entitled "MEDIA EXTENSION APPARATUS AND METHODS FOR USE IN AN INFORMATION NETWORK", and issued as U.S. Pat. No. 8,078,669 on Dec. 13, 2011, each of the foregoing incorporated herein by reference in its entirety. Myriad other combinations and variations of the CPE 110 will also be recognized by those of ordinary skill given the present disclosure.

Channel-Bonded and Multi-Channel Embodiments—

The present invention may also be used in a network where the all-digital content is distributed using a channel bonding technique for at least a portion of the useful spectrum. Channel bonding in the present context refers to, inter alia, the technique of joining RF spectrum associated with more than one physical channel into a single wideband channel, such that a single digital stream is modulated on this wideband channel. Bonded channels may or may not be disposed at contiguous frequencies within the frequency spectrum; e.g., (i) two or more QAMs disposed at frequencies which are directly contiguous; (ii) two or more QAMs which are disposed at frequencies which are contiguous but separated by a small guard band; (iii) two or more QAMs disposed at non-contiguous frequencies; i.e., are separated by one or more other QAMs; or (iv) any combination of the foregoing. One exemplary channel bonding technique useful with the present invention is described in co-owned U.S. patent application Ser. No. 11/013,671 filed Dec. 15, 2004 entitled "METHOD AND APPARATUS FOR WIDEBAND DISTRIBUTION OF CONTENT", and issued as U.S. Pat. No. 9,723,267 on Aug. 1, 2017, which is incorporated herein by reference in its entirety, although other approaches may be used as well.

Another embodiment of the present invention is implemented by incorporating multiple local content (e.g., PEG) insertion capabilities in the same apparatus. For example, in one variant, a single insertion device such as that described previously herein with respect to FIG. 2A may be configured to utilize multiple channels (e.g., multiple 6 MHz physical channels), and perform simultaneous insertion of multiple local content streams. Alternatively, multiple analog streams can be encoded and included as different PIDs within a common MPTS on a common QAM. Various other combinations are possible.

Moreover, such multiple insertion capabilities may be homogeneous in nature (e.g., two or more 6 MHz QAMs within the same carrier spectrum as described above) or heterogeneous (e.g., one satellite channel insertion device, and one RF coaxial cable insertion device, etc.). Many different combinations of different delivery paradigms (including radio frequency over coaxial cable, satellite wireless, millimeter wave wireless, and optical modalities) will be appreciated by those of ordinary skill given the present disclosure.

Optical Network Variants—

In another embodiment, the above described methods may be utilized in an optical domain (rather than an RF domain). For instance, a PEG signal may be inserted at or via the wave division multiplexer (WDM) before it is sent to the PON. In one embodiment, this would enable insertion to occur at just prior to receipt of the signal by an individual or entity located at a premises (e.g., a particular apartment in an apartment building).

For example, using a Fiber to the Premises (FTTP) and passive optical network (PON) technology, service may be provided. In one embodiment, audio, video, and data travel over designated wavelengths in the optical or infrared spectrum. A single-mode optical fiber extends from an optical line terminal (OLT) at a central office (or headend) to a neighborhood. At the neighborhood, an optical splitter may fan out the same signal thereby serving subscribers. In one embodiment, the optical splitter fans out on up to e.g., 32 fibers, thus serving up to 32 subscribers. Within a subscriber's home, an optical network terminal (ONT) transfers data onto the corresponding copper wiring for service.

In yet another embodiment, three wavelengths are used for distributing content and data; one of the three being devoted to carrying content channels and the other two being devoted to all data (e.g., one wavelength for outbound and the other for inbound data), such as IPTV video, telephone and/or Internet data. This wavelength allocation may, in one embodiment, adhere to the Telecommunication Standardization Sector of International Telecommunication Union (ITU-T) G.983 recommendation, also known as APON or BPON, entitled "Broadband optical access systems based on Passive Optical Networks (PON)", which is incorporated by reference herein in its entirety. For example, wavelength bands and speeds may be utilized as disclosed in ITU-T G.984 recommendation, entitled "A broadband optical access system with increased service capability using dynamic bandwidth assignment" which is also incorporated herein by reference in its entirety and which discloses a 1310 nm band for upstream data at 155 Mbit/s (1.2 Gbit/s with GPON), a 1490 nm band for downstream data at 622 Mbit/s (2.4 Gbit/s with GPON), and a 1550 nm band for RF (non IPTV) video with 870 MHz of bandwidth.

It is noted that in one such model, only Video On Demand (VOD) content and interactive features, such as e.g., EBIF Widgets or Programming Guide data, are delivered over IP. The remainder of the content, including Pay Per View (PPV) is not delivered over IP (e.g., as IPTV), but rather is provided over a standard broadcast video signal which carries both analog and digital content up to 870 MHz. This broadcast content originates from a traditional cable headend that combines analog channels with digital QAM channels and eventually arrives at a local serving office. The RF signal occupies 870 MHz and is modulated onto the 1550 nm wavelength. The optical video signal at 1550 nm is then coupled with the IP Data signal at 1490 nm via the use of the WDM, and is sent out to the PON. The WDM also directs the incoming 1310 nm return from the ONT back to the OLT. At the ONT, the RF video is sent over a coax connection to a set-top box that handles both RF and IPTV video. In one embodiment, the ONT provides Internet connectivity via an RJ45 connector, but also transfers IPTV video and internet IP packets onto coax using a 1.1 GHz channel to provide 100 Mbit/s of bandwidth as specified by the Multimedia over Coaxial (MoCA) standard version 1.1, which is incorporated herein by reference in its entirety.

Broadcast Switched Variants—

As previously discussed with respect to FIG. 1C, one network content delivery paradigm in common use comprises the broadcast switched architecture (BSA), wherein a hub-level switch (along with much other intelligence distributed throughout various components of the network) is used to selectively switch-in and switch-out program streams; e.g., removing those that no subscriber is watching at that time so as to conserve downstream bandwidth.

Such switching in and out can also be performed on local (e.g., PEG) streams of the type described previously herein.

For instance, if no one is watching a PEG-related program channel, the hub switch (see FIG. 1C) can simply switch that program stream out from delivery using extant BSA mechanisms, assuming that the PEG stream is provided to the switch as part of an SPTS or MPTS.

Alternatively, the BSA server or controller (or SRM) can instruct the insertion device 200, 250, 270, such as via the management interface 212 previously described, to cease encoding or modulation/insertion of the stream, in effect switching the PEG content out at the insertion device itself.

Under either approach, however, the channel map associated with the BSA delivery network must be dynamically updated for the local or PEG content. Specifically, under the non-switched delivery paradigms previously discussed herein, the channel map management is quite simple; the MSO can use an existing channel identifier associated with local programming (e.g., "Local"), thereby avoiding complex mapping tables or conversions. However, in the BSA context, the channel mapping (i.e., what program stream is physically located on what QAM, and what that stream's identifier is) may be constantly changing as different program streams are switched in or out, and hence the insertion device must be dynamically updated to reflect these changes and in effect know where to put the PEG stream(s). Thus, in one embodiment, the STB loads a mini-channel map (e.g., from a network entity such as a carousel or mini-carousel server) which is constantly and dynamically updated with channel mapping data. The updated data may be provided or accessible to the CPE via e.g., a round-robin or other well known scheme. The STB may then utilize the updated channel map internally to determine which RF channels to tune to for a particular program stream. That way, rapidly changing channel mapping is timely communicated to the CPE to enable it to "keep up" with the changes made by the program insertion device 200, thereby avoiding any latency in the BSA switching operations.

WiMAX Variants—

In another implementation (not shown), content and/or data may be distributed to or from the program insertion device (or a modem associated therewith) via Worldwide Interoperability for Microwave Access (WiMAX) transport; see IEEE Std. 802.16e-2005 entitled "IEEE Standard for Local and metropolitan area networks—Part 16: Air Interface for Fixed and Mobile-Broadband Wireless Access Systems Amendment 2: Physical and Medium Access Control Layers for Combined Fixed and Mobile Operation in Licensed Bands" which is incorporated herein by reference in its entirety). For example, multiple WiMAX base stations may be established by the MSO or other content provider. One or more of the WiMAX stations transmit programming or other content and/or data to the insertion device 200 of FIG. 2A (which may including simultaneously, so as to ensure a robust signal is received and to potentially support any QoS requirements). In one embodiment, the input to the AV input subsystem 214 is obtained from a local or remotely connected WiMAX broadband interface. In another embodiment, the WiMAX interface is used to pass information between the insertion device and the remote network management entity 220 (FIG. 2A). Various other variations and permutations of the foregoing will be recognized by those of ordinary skill given the present disclosure.

Operations/Business Rules and Methods—

In another aspect of the invention, the aforementioned insertion apparatus 200, 250, 270 may comprise a so-called "rules" engine; e.g., rendered as one or more computer programs running on the insertion apparatus, or on a remote management device 220 such as that of FIG. 2A previously described herein. This engine comprises, in an exemplary embodiment, a series of software routines or other associated hardware/firmware environment adapted to control the operation of the insertion algorithms previously described. These rules may also be fully integrated within the insertion apparatus 200, 250, 270 itself, and controlled via e.g., a GUI on a PC connected to or indigenous with the apparatus. In effect, the rules engine comprises a supervisory entity which monitors and selectively controls the local content insertion functions at a higher level, so as to implement desired operational or business rules. The rules engine can be considered an overlay of sorts to the content insertion algorithms of the apparatus 200, 250, 270. For example, the insertion apparatus may invoke certain operational protocols or decision processes based on management commands received from the management entity 220. However, these processes may not always be compatible with higher-level business or operational goals, such as maximizing profit, subscriber satisfaction and experience, or system reliability. Hence, when imposed, the business/operational rules can be used to dynamically (or manually) control the operation of the insertion apparatus 200, 250, 270. The rules may be, e.g., operational or business-oriented in nature, and may also be applied selectively in terms of time of day, duration, specific local areas, or even at the individual user level.

For example, one rule implemented by the rules engine may comprise always selecting a certain QAM (e.g., 6 MHz channel) within a downstream transport for content insertion, thereby providing for predictable channel mapping (and obviating many otherwise necessary mapping table updates) as previously described herein.

Another rule might impose a moratorium on inserting or substituting local content into physical channels/QAMs until a certain minimum threshold of available bandwidth is present, thereby avoiding contention for bandwidth resources with "premium" services such as VOD, BSA switching requests, or the like.

It will also be appreciated that certain broadcast channels or program streams can be considered a basis for local content substitution. Specifically, the rules engine might dynamically identify the worst-performing program streams within a pool of streams in a multiplex, and select this stream (via its PID, as previously described) as the first in a hierarchy or queue to be replaced with local content. As used in the present context, the term "worst performing" may refer to any one or more business, operational, or other indicia such as for example the least-watched program stream of the pool at that point in time, that which has the lowest advertising/profitability coefficient, and so forth. In this fashion, where bandwidth or other network resources are in contention, the rules engine will ensure that the least "significant" program stream is always substituted out.

Similarly, the rules engine may be equipped to determine whether a substitution/insertion should even be performed at all, for example in the case where use of the same bandwidth for a non-PEG/local service would have much greater revenue or profit potential, such as in the case of being able to deliver added VOD sessions or the like. Conversely, the PEG/local content can be treated as "protected" content, wherein it will always have priority (at least for that hub or insertion location) over other uses such as VOD, BSA streams, PPV, etc.

Many other approaches and combinations are envisaged consistent with the invention, as will be recognized by those of ordinary skill when provided this disclosure.

In another aspect, the present invention can advantageously be utilized to perform "backhauls" to the local hub or other network node, which may even include the root node of the subscriber's premises network (discussed in greater detail below). For example, as described in co-owned and co-pending U.S. patent application Ser. No. 11/186,452 filed Jul. 20, 2005 and entitled "METHOD AND APPARATUS FOR BOUNDARY-BASED NETWORK OPERATION" previously incorporated herein, a business-class circuit backhaul to the local hub is envisioned, such as for "neighborhood camera" applications. In one exemplary embodiment, separate analog video feeds from one or more cameras (or other sensors) are generated and backhauled using the local content-based network distribution system. These cameras or sensors may be disposed in and utilized for any number of different functions, such as in a high-rise to monitor various areas for security, at the gates of a gated community, in an enterprise or business facility, such as to monitor various inventory storage locations or portions of the manufacturing line, by at government laboratories or military installations, etc. Specifically, this backhaul" approach removes downstream bandwidth limitations; rather, the only effective limitations are in the upstream direction (since the analog video signals from the cameras/sensors are being backhauled to the local hub in the upstream direction). When the insertion apparatus at the hub is reached, the backhauled analog content is digitally encoded and inserted into a downstream multiplex as previously described herein, thereby providing for "all digital" delivery to the relevant premises serviced by that distribution hub.

Furthermore, there is advantageously no requirement that the cameras or sensors be disposed on same physical topology. Specifically, the backhaul of the analog signals of the present invention may be wireless, coax, fiber, DDAS (development dedicated access services), etc., or any mix thereof.

The analog signal can also be backhauled further inward toward the core, repeated (replicated) and digitally encoded, and then made available to multiple different hub servers, the latter being disposed closer to the edge of the network. Ideally, the length of the backhaul is kept to the minimum, so as to reduce the need to deploy additional transport capacity (and bandwidth), as well as to reduce latency of the system, and increase reliability.

Moreover, as previously noted, the insertion apparatus may also be used in a "private network" such as a hotel's cable network or a multi-unit complex (MUC) coaxial network. A single program insertion device may for example be deployed at the root node of such a private network. The root node typically comprises the location from where a full bandwidth (or nearly full bandwidth) downstream channel is available to all set top boxes connected to the coaxial cable network. PEG/local programming may then be advantageously inserted by feeding the analog programming to the insertion device at root node of the private network.

Another business-related advantage of the present invention is that by including the analog local/PEG content as a part of the all-digital multiplex, the need to have an additional (NTSC) tuner in a CPE to receive analog transmission of programs is obviated. Without the present invention, a CPE would require two tuners: one two receive the all-digital programming and the other tuner to receive the local/PEG programming. As a result of the present invention, the conventional analog tuner is needed only at the insertion device of the present invention. Because the number of hubs in a typical content distribution network is significantly less than the number of CPEs, the present invention results in significant cost savings by elimination of the need of the additional tuner hardware. This affords the MSO the ability to distribute CPE (e.g., set top boxes) that do not include a NTSC tuner, thereby providing very significant cost savings when considered in light of the volume of CPE that the MSO might deliver (which may number in the millions of units). Hence, for example if a NTSC tuner costs an additional $5 to the price of the CPE, and the MSO must distribute 2 million such units, the savings is on the order of $10,000,000. This can be pocketed by the MSO, or divided between the MSO and the subscribers, such as in the form of rebates, reduced subscription fees, more features for the same subscription fees, etc. Also, as previously noted, subscribers are relieved of having to have a television with a NTSC tuner for the local/PEG programming in cases where the MSO-supplied CPE does not have one.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. Computerized apparatus disposed at a node in a network, said computerized apparatus comprising:
 a receiver apparatus configured to receive an incoming digital signal over at least one radio frequency band;
 a data input apparatus configured to receive packetized Internet protocol (IP) data;
 a data combination apparatus configured to:
  (i) combine said packetized IP data with at least a portion of said incoming digital signal to generate an outgoing digital signal, and
  (ii) dynamically update a channel map, said update comprising removal of an existing program identifier (PID) associated with said incoming digital signal from said channel map and generation of a PID for said packetized IP data, said generated PID mapped into said channel map; and
 a transmission apparatus configured to transmit said outgoing digital signal to a receiver disposed at a premises of a user of said network;
 wherein said updated channel map enables a subsequent receiver of said packetized IP data transmitted by said transmission apparatus to access said packetized IP data.

2. The computerized apparatus of claim 1, wherein said incoming digital signal comprises a first multi-program transport stream (MPTS) comprising a plurality of single program transport streams (SPTS).

3. The computerized apparatus of claim 2, further comprising:
a removal apparatus configured to remove at least one of said SPTS from said first MPTS to generate a second MPTS; and
wherein said data combination apparatus is configured to combine said packetized IP data with at least a portion of said incoming digital signal by insertion of said IP packetized data into said second MPTS in place of said removed SPTS.

4. The computerized apparatus of claim 2, further comprising:
a removal apparatus configured to remove a plurality of packets of at least one of said SPTS to create sufficient space to accommodate said packetized IP data within said at least one SPTS; and
wherein said data combination apparatus is configured to combine said packetized IP data with at least a portion of said incoming digital signal by replacement of said removed packets of said at least one SPTS with packets of said packetized IP data.

5. The computerized apparatus of claim 1, further comprising:
modulation apparatus configured to modulate said packetized IP data to a modulation scheme used with said incoming digital signal; and
upconversion apparatus configured to upconvert said modulated packetized IP data to a frequency associated with said radio frequency band.

6. The computerized apparatus of claim 1, wherein:
said node is disposed within said network and outside of a core portion thereof;
said network comprises a managed digital content distribution network; and
said outgoing digital signal comprises an IP-over-MPEG (Moving Picture Experts Group) transport stream.

7. A computerized method for distributing content over a network, the computerized apparatus comprising:
receiving, via a receiver apparatus, first signals over at least one radio frequency band, the first signals comprising digitally rendered content;
receiving, via an input apparatus, second signals;
combining, via a combination apparatus, the second signals with at least a portion of the first signals to generate outgoing digital data, the combining comprising updating a channel map, the updating comprising (i) removing an existing program identifier (PID) associated with the first signals from the channel map and (ii) generating a PID for the second signals, the generated PID mapped into the channel map; and
transmitting, via a transmitter apparatus, the outgoing digital data to a receiver disposed at a premises of a user of the network;
wherein the updated channel map enables a subsequent receiver of the second signals transmitted by the transmission apparatus to access the second signals.

8. The computerized method of claim 7, wherein the receiving the first signals comprises receiving a multi-program transport stream (MPTS), and the removing of the existing PID associated with the first signals from the channel map effects a removal of Moving Picture Experts Group (MPEG)-2 packets associated with the existing PID from the MPTS.

9. The computerized method of claim 7, wherein:
the first signals comprise at last one Quadrature amplitude modulation (QAM)-modulated channel filtered from a multiplexed transport stream;
the second signals comprises an analog content stream that has been digitally encoded; and
the combining comprises performing a replacement of the at least one QAM-modulated channel with the digitally encoded analog content stream.

10. The computerized method of claim 7, wherein:
the second signals comprises an analog content stream; and
the combining comprises performing a replacement of at least one radio frequency channel with the digitally encoded analog content stream; and
wherein the method further comprises digitally encoding the received analog content stream prior to the combining.

11. The computerized method of claim 7, wherein:
the first signals comprise a first digital multiplex of a plurality of program streams;
the second signals comprises digitally rendered content; and
the combining comprises performing a replacement of one or more of the plurality of program streams with the digitally rendered content.

12. The computerized method of claim 11, wherein the performing the replacement comprises: (i) removing the one or more of the plurality of program streams of the first digital multiplex to generate a second digital multiplex, and (ii) inserting the digitally rendered content into the second digital multiplex without de-multiplexing the first digital multiplex.

13. Computer readable apparatus comprising a non-transitory storage medium, the non-transitory medium comprising at least one computer program having a plurality of instructions, the plurality of instructions configured to, when executed on a processing apparatus:
receive, via a first receiver apparatus, one or more first program transport streams over at least a portion of a content delivery network;
receive, via a second receiver apparatus, a content stream;
combine, via a data combination apparatus, the content stream with at least a portion of the one or more first program transport streams to generate a combined digital signal, wherein the combination comprises an update of a channel map, the update comprising removal of existing program identification data associated with at least the portion of the one or more first program transport streams from the channel map and generation of program identification data for the content stream, the generated program identification data mapped into the channel map; and
transmit, via a transmission apparatus, the outgoing combined digital signal to a receiver device disposed at a premises of a user of the content delivery network;
wherein the updated channel map enables the receiver device of the content stream transmitted by the transmission apparatus to access the content stream.

14. The computer readable apparatus of claim 13, wherein the receipt of the content stream comprises receipt of an analog content stream generated by a video apparatus, the video apparatus disposed within the content delivery network and outside of a core portion thereof so as to obviate at least a portion of backhaul infrastructure otherwise required to transmit the analog content stream to the core portion.

15. The computerized readable apparatus of claim 13, wherein:
the content stream comprises a modulated and upconverted digitally formatted content stream; and the combination further comprises replacement of a program stream of the first program transport stream with the modulated and upconverted digitally formatted content stream.

16. The computerized readable apparatus of claim 15, wherein the plurality of instructions are further configured to, when executed on the processing apparatus:
receive the channel map provided with the first program transport stream, the channel map comprising a plurality of associations between a plurality of channel assignments, radio frequency channel parameters, and program identification data; and
wherein the update comprises a modification of the channel map to replace a first channel assignment associated with the portion of the one or more first program transport streams with a second channel assignment associated with the content stream.

17. The computerized readable apparatus of claim 16, wherein the plurality of instructions are further configured to, when executed on the processing apparatus:
filter out a radio frequency band from the first program transport stream based at least in part on the channel map; and
insert the content stream into the filtered first program transport stream.

18. The computerized readable apparatus of claim 16, wherein the plurality of instructions are further configured to, when executed on the processing apparatus:
remove packets associated with a program stream of the first program transport stream; and
insert the modulated and upconverted digitally formatted content stream into the first program transport stream by replacement of the removed packets after determination that sufficient bandwidth exists to support the replacement.

19. The computerized readable apparatus of claim 13, wherein the receipt of the content stream comprises receipt of an analog content stream, and the plurality of instructions are further configured to, when executed on the processing apparatus:
encode the analog content stream into a digital format using a variable bitrate (VBR) encoding algorithm.

20. The computerized readable apparatus of claim 13, wherein the content stream comprises analog video signals generated at a video apparatus disposed at one or more locations at an edge of the network.

* * * * *